United States Patent [19]
Asayama et al.

[11] Patent Number: 5,417,622
[45] Date of Patent: May 23, 1995

[54] APPARATUS FOR CONTROLLING LOCK-UP CLUTCH

[75] Inventors: Yoshio Asayama, Chigasaki; Makio Tsubota, Hiratsuka; Yasunori Okura, Hiratsuka; Takayuki Sato, Hiratsuka, all of Japan

[73] Assignee: Kabushiki Kaisha Komatsu Seisakusho, Japan

[21] Appl. No.: 444,123

[22] PCT Filed: May 23, 1988

[86] PCT No.: PCT/JP88/00485
§ 371 Date: Jun. 18, 1991
§ 102(e) Date: Jun. 18, 1991

[87] PCT Pub. No.: WO88/09454
PCT Pub. Date: Dec. 1, 1988

[30] Foreign Application Priority Data

| May 22, 1987 | [JP] | Japan | 62-127318 |
| May 22, 1987 | [JP] | Japan | 62-127319 |
| May 29, 1987 | [JP] | Japan | 62-135783 |
| May 29, 1987 | [JP] | Japan | 62-135784 |
| May 30, 1987 | [JP] | Japan | 62-135838 |

[51] Int. Cl.⁶ .................. F16H 61/14; F16H 45/02
[52] U.S. Cl. ........................ 477/63; 477/65; 192/3.3; 74/733.1
[58] Field of Search ............ 74/890, 731.1, 732.1, 74/733.1; 192/3.3, 3.31, 85 R; 477/62, 63, 64, 65

[56] References Cited

U.S. PATENT DOCUMENTS 4,671,139  6/1987  Downs et al. .......... 74/733.1 X
5,035,312  7/1991  Asayama et al. ........ 192/85 R

FOREIGN PATENT DOCUMENTS 60-14652   1/1985  Japan .
60-143268  7/1985  Japan .
60-256675 12/1985  Japan .
1009824    4/1983  U.S.S.R. .

Primary Examiner—Richard M. Lorence
Attorney, Agent, or Firm—Welsh & Katz, Ltd.

[57] ABSTRACT

A lock-up clutch by way of which input/output shafts of a torque converter are operatively connected to each other is connected to an electronic type pressure control valve. During speed changing in a transmission, the problem of interruption of torque transmission can be solved by turning off the lock-up clutch at the time when filling of one of the speed changing clutches to be next brought into an operatively engaged state with hydraulic oil is completed. Hydraulic pressure ($P_t$) in the torque converter is exerted on the back pressure portion of a piston of the lock-up clutch while hydraulic pressure ($P_t$) in the torque converter is exerted on the proportional solenoid side of the pressure control valve, making it possible to reduce the initial hydraulic pressure. During speed changing, the lock-up clutch is not fully released from the engaged state but maintains its operative state at low pressure, causing shock from shifting the lock-up state to be reduced. When hydraulic pressure is gradually increased, the extent of opening the throttle, weight of the vehicle and the current gear ratio are derived so as to vary the rate of gradual increase of hydraulic pressure depending on values of these parameters.

10 Claims, 26 Drawing Sheets

APPARATUS FOR CONTROLLING LOCK-UP CLUTCH

TECHNICAL FIELD

This invention relates to a speed changing (shift change) system including a lock-up clutch by way of which input and output shafts of a torque converter are operatively connected to each other, wherein the technical improvement consists in that shock caused during speed changing or at the time of starting of forward movement of a vehicle is canceled, interruption of transmission of torque is prevented and cost for fuel consumption is reduced.

BACKGROUND ART

A conventional speed changing (transmission) unit is constructed such that the output shaft of an engine is connected to the input shaft of a torque converter and the input shaft of a transmission is connected to the output shaft of the torque converter, while a lock-up clutch is interposed between the input and output shafts of the torque converter so as to operatively connect them to each other via the lock-up clutch.

Such a lock-up clutch has the following five problems from the viewpoints of structure and control.

(1) Problem relating to hydraulic pressure in the torque converter

FIG. 25 is a hydraulic circuit diagram which illustrates a conventional control system for the lock-up clutch. This control system includes a lock-up clutch 4, a torque converter 2, a transmission tank 100, a strainer 101, a hydraulic pump 5, a main relief valve 102, a torque converter relief valve 103, a rear brake ring 104, an oil cooler 105, a plurality of oil filters 106, a cooling relief valve 107, a lubricating relief valve 108, a transmission lubricating section 109, a lock-up modulation valve 110 and a solenoid valve 120. The lock-up clutch 4 is controlled with respect to its operative engagement, disengagement from the operatively engaged state and gradual increasing of hydraulic pressure by operating the lock-up modulation valve 110 via the solenoid valve 120.

FIG. 26 is a schematic sectional view which illustrates by way of example the inner structure of such a conventional modulation valve 110 and solenoid valve 120 and FIG. 27 shows a plurality of characteristic diagrams for respective component each illustrating how characteristics vary during speed changing (i.e., shift change) as time elapses.

Specifically, with this control system, during speed changing, a lock-up "OFF" signal is first sent to a solenoid of the solenoid valve 120 (time $t_1$). As a result, the solenoid valve 120 is brought in an opened state as shown in FIG. 25, whereby pilot hydraulic pressure set by the main relief valve 102 flows through the solenoid valve 120 to displace a piston 130 of the modulation valve 110 in the leftward direction. As the piston 130 displaces a spool 132 in the leftward direction via the piston 131, a port D which has been communicated with the lock-up clutch 4 is closed with the spool 132 and thereby hydraulic oil in the lock-up clutch 4 is drained.

Then, after a predetermined period of lock-up delay time for holding the lock-up clutch 4 in an OFF state elapses, a lock-up "ON" signal is sent to the solenoid of the solenoid valve 120 (time $t_2$). As a result, the solenoid valve 120 is shifted to a closed state so that working oil which has thrusted the piston 130 is drained via the solenoid valve 120. Thus, pressure of the working oil which has thrusted the piston 130 is reduced to a level of 0 Kg/cm², causing the spool 132 to be displaced in the rightward direction by a spring 133 until the valve 110 is brought in an opened state. Consequently, main hydraulic oil flows in an order of A→C→D and is introduced into the lock-up clutch 4. After a filling time $t_f$ elapses, the lock-up clutch 4 is fully filled with hydraulic oil.

At this moment, hydraulic oil which has been introduced through the port D enters a hydraulic chamber 135 between the piston 131 and the spool 132 via an orifice 134 with the result that hydraulic pressure $P_v$ at an outlet of the valve is set to an initial pressure $P_o (=Kx/S_1)$ under a condition that a force induced by hydraulic pressure active on a pressure receiving area $S_1$ of the piston 131 is balanced with resilient force (kx, where K designates a spring constant and x designate an initial displacement) (see FIG. 27(c)). Thereafter, hydraulic oil which flows through a drilled hole in the valve body 136 to reach a hydraulic chamber behind a piston 139 via an orifice 138 in the cover 137 thrusts the piston 139 in the rightward direction. As the piston 139 moves in the rightward direction, hydraulic pressure in the lock-up clutch 4 is increased.

On the the hand, for the period $t_f$ of filling, hydraulic pressure in the lock-up clutch 4 is held at a level of almost zero but it is gradually increased after it is raised up to initial hydraulic pressure $P_a$ at the same time when the filling is completed (time $t_3$). When the piston 139 comes in contact with a stopper, increasing of hydraulic pressure is stopped and hydraulic pressure at this time becomes a set pressure $P_b$ for the lock-up valve (time $t_4$).

Operation of the modulation valve 110 during the speed changing has been described above. The initial hydraulic pressure $P_a$ and a characteristic of gradual increasing of hydraulic pressure derived from the conventional modulation valve 110 are firmly determined depending on the set load Kx of the spring 133, the pressure receiving area $S_1$ of the piston 131 and other factors. Thus, hydraulic pressure can not be changed arbitrarily.

Further, the foregoing control system is constructed such that the lock-up clutch 4 is fully immersed in a hydraulic chamber of the torque converter 2 and the hydraulic pressure $P_t$ in the torque converter 2 is exerted on the back pressure portion of a piston of the lock-up clutch 4 via a hydraulic passage 115 (see FIG. 25). Accordingly, with this control system, e.g., at the time point $t_3$ when hydraulic pressure P in the lock-up clutch 4 is raised up to the initial hydraulic pressure $P_a$, the lock-up clutch 4 is practically operated with a differential pressure $P_s (=P_a-P_t)$ derived by subtracting the hydraulic pressure $P_t$ in the torque converter 4 from the initial clutch pressure $P_a$, as shown in FIG. 27(d). Thus, when the lock-up clutch 4 is to be brought in an operatively engaged state, it is not filled with hydraulic oil and thereby it fails to be brought in an operatively engaged state, unless hydraulic oil having hydraulic pressure higher than the hydraulic pressure $P_t$ in the torque converter 2 is supplied to the lock-up clutch 4. Here, the differential pressure $P_s$ caused when the clutch hydraulic pressure P is raised up to the initial hydraulic pressure $P_a$ will be hereinafter referred to as an actual initial hydraulic pressure.

For the reason, a conventional apparatus for controlling a lock-up clutch is constructed such that the initial hydraulic pressure $P_a$ is set appreciably higher than the hydraulic pressure $P_t$ in the torque converter 2 and hydraulic pressure for the lock-up clutch 4 is then gradually increased from the initial hydraulic pressure $P_a$.

However, the hydraulic pressure $P_t$ in the torque converter 2 varies as an engine speed varies. Thus, with the conventional control system, the actual initial hydraulic pressure $P_s$ varies as the hydraulic pressure $P_t$ in the torque converter 2 varies. Accordingly, with the conventional control system, since the initial hydraulic pressure $P_a$ in the lock-up clutch 4 is kept unchanged, e.g., when the hydraulic pressure $P_t$ in the torque converter 2 is increased, the actual initial hydraulic pressure $P_s$ is reduced.

In this manner, with the conventional apparatus, since the actual initial hydraulic pressure $P_s$ to be practically exerted on the lock-up clutch 4 varies as hydraulic pressure in the torque converter 2 varies, the initial hydraulic pressure $P_a$ to be given by the modulation valve 110 is set to such a high pressure that the actual initial hydraulic pressure $P_s$ is not less than zero or is not equal to zero. For the reason, with the conventional apparatus, a period of clutch engaged time (i.e., filling time) fluctuates with the result that a malfunction such as a large magnitude of shock caused by speed changing (shift change) occurs (see FIG. 27(f)).

(II) Problem relating to lock-up off timing

FIGS. 28(a), (b) and (c) show how hydraulic pressure in a first speed clutch, hydraulic pressure in a second speed clutch and hydraulic pressure in a lock-up clutch vary as time elapses, while taking account of speed changing, e.g., from the first speed to the second speed, respectively.

According to the conventional control system, if a speed changing command is issued at the time $t_1$, the first speed clutch and the lock-up clutch are turned off at this time $t_1$ and hydraulic oil starts flowing in the clutch for second speed. As a result, at the time $t_1$, hydraulic pressure exerted on the clutch for first speed and hydraulic pressure exerted on the lock-up clutch are reduced from a predetermined pressure to a level of zero, as shown FIGS. 28(a) and (c). On the other hand, hydraulic pressure exerted on the clutch for second speed starts gradual increasing from the time $t_2$, after the filling time $t_f$ elapses, as shown in FIG. 28 (b).

The filling time $t_f$ represents a time for which hydraulic oil is filled in an empty clutch pack at the rear stage clutch. When the clutch pack is fully filled with hydraulic oil, the filling time is terminated and hydraulic pressure in the clutch at the rear stage (clutch for second speed) starts increasing.

As the filling time $t_f$ elapses, output torque from the speed changing unit is reduced to a level of zero, as shown in FIG. 28(d). The reason why such reduction occurs is attributable to the following two factors.

The reason why the lock-up clutch is released during speed changing consists in reducing load to be carried by the speed changing clutch or suppressing consumption of energy generated by the engine. With the prior art, however, the lock-Up clutch is turned off at the same time when the clutch at the front stage (clutch for first speed) is opened (time $t_1$). While the lock-up clutch is turned off, engine output passes through the torque converter but, at the time of this operative state, a speed ratio of turbine to pump in the torque converter, i.e. an e value ($=N_t/N_p$) assumes 1. FIG. 29 shows a plurality of characteristic curves of the torque converter. As is apparent from the drawing, when the foregoing speed ratio e is 1, the torque converter remains within the coupling range (the working range having a torque ratio of 1) but does not remain within the converter range (the working range in which torque exchange takes place). Thus, torque exchange does not take place in the torque converter at any time later than the time $t_1$ when the lock-up clutch is turned off.

For the period of filling time $t_f$ until the clutch pack is fully filled with hydraulic oil, hydraulic pressure is not raised up to a level sufficient to bring the clutch in an operatively engaged state.

In this manner, according to the conventional control system, the period of time $t_1$ to $t_2$ for which output torque is reduced to zero is existent due to the above-described two factors and the foregoing period of time offers a factor of breathing at the time of speed changing or degrading a property of acceleration.

(III) Problem relating to hydraulic pressure in the lock-up clutch for the period of time from lock-up off till lock-up on Usually, a system wherein at the time of speed changing, the lock-up clutch is completely released from the operatively engaged state (hydraulic oil in the clutch is drained, in other words, hydraulic pressure in the clutch is reduced to zero) and then pressurized hydraulic oil is supplied again (during speed changing, the vehicle runs with the use of the torque converter to reduce a load to be carried by the speed changing clutch) is employed for the conventional apparatus. This leads to such problems that time required for filling the lock-up clutch with hydraulic oil, i.e., the filling time fluctuates and a large magnitude of shock occurs when the lock-up clutch is brought in an operatively engaged state.

(IV) Problem at the time of gradual increasing of hydraulic pressure

As described above, the conventional modulation valve 110 provides an uniformly extending firm pattern of hydraulic oil in the lock-up clutch and thereby a characteristic of gradual increasing of hydraulic pressure at the time of starting of forward movement of the vehicle or during speed changing is kept constant at all times.

(V) Problem relating to hydraulic pressure in the lock-up clutch during normal running of the vehicle When the lock-up clutch is brought in an operatively engaged state, the input shaft of the transmission is connected directly to the output shaft of the engine. This permits variation of torque of the engine to be transmitted to the output shaft of the transmission. With the conventional apparatus, however, since the lock-up clutch is supplied with hydraulic oil having a comparatively high pressure during normal running of the vehicle, variation of torque of the engine is transmitted to the output shaft of the transmission as it is left unchanged. Due to this problem, the conventional apparatus does not carry out lock-up running not only in a low speed region where the engine is rotated at a low speed but also in a high speed region where the engine is rotated at a comparatively high speed. This leads to another problem that the engine is rotated with a degraded property of fuel consumption.

The present invention has been made with the foregoing background in mind.

An object of the present invention is to provide an apparatus and a method for controlling a lock-up clutch wherein variation of the actual initial hydraulic pressure corresponding to variation of hydraulic pressure in the torque converter can be prevented reliably.

Other object of the present invention is to provide an apparatus and a method for controlling a lock-up clutch wherein a phenomenon of breathing during speed changing can be prevented by eliminating a period of time for which output torque during speed changing is reduced to a level of zero, a property of acceleration can be improved and shock caused by speed changing and locking-up can be reduced substantially.

Another object of the present invention is to provide an apparatus and a method for controlling a lock-up clutch wherein a property of fuel consumption can be improved by frequently executing lock-up running of the vehicle.

DISCLOSURE OF THE INVENTION

There is provided according to one aspect of the present invention an apparatus for controlling a lock-up clutch, wherein the apparatus includes a pressure control valve which is constructed such that hydraulic pressure at an output port leading to the lock-up clutch is exerted on one pressure receiving surface of a spool and the other pressure receiving surface is thrusted by an actuator adapted to generate a thrust force in response to an electrical command, and controlling means for allowing the electrical command to be inputted into the pressure control valve for carrying out-control for opening/closing of the pressure control valve and gradual increasing of hydraulic pressure in response to the electrical command, whereby hydraulic pressure in a torque converter can be exerted on the pressure receiving surface on the actuator side of the pressure control valve.

With the apparatus as constructed in the above-described manner, hydraulic pressure in the torque converter is fed back to the pressure control valve so that hydraulic pressure in the lock-up clutch is added with a bias corresponding to the hydraulic pressure in the torque converter. This causes a sum of hydraulic pressure generated in correspondence to the electrical command and hydraulic pressure in the torque converter to be exerted on the lock-up clutch. Consequently, the hydraulic pressure in the torque converter to be exerted on the back pressure portion of a piston of the lock-up clutch is canceled with the hydraulic pressure in the torque converter which has fed back to the pressure control valve.

In this manner, according to the present invention, operative engagement of the lock-up clutch can be controlled by an electronic type pressure control valve which can output an arbitrary intensity of hydraulic pressure in response to the electrical command, whereby hydraulic pressure in the lock-up clutch can gradually be increased in an arbitrary manner. Further, since hydraulic pressure in the torque converter is fed back to the pressure control valve, variation of the hydraulic pressure in the torque converter has no effect on the hydraulic pressure generated in response to the electrical command, i.e., the hydraulic pressure practically relating to the operative engagement of the lock-up clutch, and the actual initial hydraulic pressure can always be maintained at a constant low pressure by holding a value of the electrical command at a constant low value at the time of completion of the filling. Thus, fluctuation of the filling time can be suppressed and shock caused by speed changing can be reduced.

According to other aspect of the present invention, the apparatus includes a first valve including a spool which is formed with an orifice at an output port leading to the lock-up clutch, the first valve being opened and closed by differential pressure across the orifice and resilient force of a spring and having an inlet port through which hydraulic oil delivered from a hydraulic pump is supplied, a second valve including a spool of which one pressure receiving surface receives hydraulic pressure before the orifice of the first valve and of which other pressure receiving surface is thrusted by an actuator adapted to generate thrust force in response to an electrical command, the second valve having an inlet port through which hydraulic oil delivered from the hydraulic pump is supplied and an outlet port leading to a region located before the orifice of the first valve, filling completion detecting means for detecting completion of filling of the lock-up clutch with hydraulic oil based on movement of the spool of the first valve, and controlling means for allowing an electrical command to be inputted into the second valve to carry out control for opening/closing of the second valve and gradual increasing of hydraulic pressure, whereby hydraulic pressure in the torque converter can be exerted on the pressure receiving surface on the actuator side of the second valve.

With the apparatus as constructed in the above-described manner, since hydraulic pressure in the torque converter is fed back to the pressure control valve in the same manner as the aforementioned invention, the actual initial hydraulic pressure does not vary even though the hydraulic pressure in the torque converter varies as the engine speed varies. Thus, such malfunctions that the lock-up clutch fails to be filled with hydraulic oil and an operatively engaged point is offset can be eliminated. Further, since an electronic type control valve is used for the second valve, hydraulic pressure in the lock-up clutch can gradually be increased in an arbitrary manner after completion of the filling. In addition, since hydraulic oil can be supplied at a high flow rate using the first valve, the time of completion of the filling can be hastened. Further, since the time of completion of the filling can exactly be controlled by the filling completion detecting means, initial hydraulic pressure in the lock-up clutch can be reduced to a level near to the hydraulic pressure in the torque converter with the result that advantageous effects such as reduction of shock caused by speed changing or the like can be obtained.

According to another aspect of the present invention, the apparatus includes a first valve for supplying hydraulic oil to a lock-up clutch from a hydraulic pump, the first valve including a spool of which one pressure receiving surface receives hydraulic pressure at an output port leading to the lock-up clutch and of which other pressure receiving surface comes in contact with one end of a spring of which other end in turn comes in contact with a piston, hydraulic pressure in a predetermined chamber into which hydraulic oil is introduced from the output port being exerted on the piston, a second valve for controlling opening/closing of the first valve in response to an electrical command inputted in an ON/OFF fashion, a third valve adapted to be shifted in response to an electrical command inputted in an ON/OFF fashion based on determination as to whether hydraulic oil in the hydraulic chamber of the first valve should be drained or not, and controlling means for controlling a shifting operation of each of the second and third valves such that the second valve is maintained in an ON state for a predetermined period of time in response to an electrical command inputted into the second valve during speed changing and the third valve is maintained in an ON state for a predetermined period of time in response to an electrical command inputted into the third valve during speed changing.

With the apparatus as constructed in the above-described manner, the first valve is opened by a controlling operation performed by the controlling means during speed changing so that hydraulic oil delivered from the hydraulic pump is supplied to the lock-up clutch and hydraulic oil in the hydraulic chamber of the first valve is drained. As a result, during speed changing, hydraulic pressure in the lock-up clutch is reduced to a predetermined hydraulic pressure which has been predetermined by initial resilient force of the spring and other pressure receiving surface of the spool and thereafter it is gradually increased from the time point when the electrical command inputted into the third valve is turned off. Namely, according to the present invention, during speed changing, hydraulic pressure in the lock-up clutch can be reduced to a predetermined pressure of which value is not zero, without drainage of hydraulic oil from the lock-up clutch.

In this manner, according to the present invention, since the apparatus is provided with a modulation valve for discharging hydraulic oil in a predetermined hydraulic chamber thereof to a drain port, hydraulic pressure in the lock-up clutch is reduced to a predetermined pressure during speed changing and the reduced hydraulic pressure is gradually increased after it is maintained for a certain period of time, no filling time is required for allowing the lock-up clutch to be fully filled with hydraulic oil. Consequently, shock caused at the time of completion of the filling can be reduced and a property of acceleration during speed changing can be improved.

Further, according to the present invention, the lock-up clutch and a plurality of speed changing clutches have a plurality of solenoid valves separately connected thereto. When termination of the filling time is confirmed with respect to a speed changing clutch to be next brought in an operatively engaged state during speed changing, the solenoid valve operatively associated with the lock-up clutch is turned off at the time point of the foregoing confirmation and the solenoid valve corresponding to the speed changing clutch to be next brought in an operatively engaged state is controlled so as to start gradual increasing of hydraulic pressure in the speed changing clutch. The solenoid valve for the speed changing clutch which has been currently brought in an operatively engaged state is turned off at the time point of termination of the filling time.

According to the present invention, since the lock-up clutch and the clutch at the front stage are held in an operatively engaged state till the time point of termination of the filling time of the clutch to be next brought in an operatively engaged state, there is no fear that output torque is reduced to a level of zero for a period of filling time. Thus, an occurrence of breathing during speed changing can be prevented and a property of acceleration can be improved.

When control is carried out in accordance with the present invention, a pressure control valve corresponding to a speed changing clutch to be next brought in an operatively engaged state is actuated as speed changing is started. To assure that output torque from the speed changing unit at the time of starting of the speed changing is equalized with output torque from the speed changing unit at the time point of completion of filling of the speed changing clutch with hydraulic oil, hydraulic pressure in the foregoing speed changing clutch (representative of the speed changing clutch to be next brought in an operatively engaged state) is calculated at the time point of starting of the speed changing and then hydraulic pressure to be added to the speed changing clutch which has been currently held in an operatively engaged state is calculated for a period of time from starting of the speed changing till completion of the filling, whereby torque before the speed changing can be coordinated with torque after the speed changing. Consequently, shock caused by the speed changing can be reduced and thereby smooth speed changing can be accomplished.

According to further another aspect of the present invention, the apparatus includes an electronic type pressure control valve connected to the lock-up clutch to generate hydraulic pressure in the lock-up clutch in response to an inputted electrical command, first detecting means for detecting an extent of opening of a throttle (throttle displacement), second detecting means for detecting weight of a vehicle, third detecting means for detecting a gear ratio of the transmission, the gear ratio being determined depending on the current speed stage, and controlling means for calculating a gradient of gradually increasing of hydraulic pressure (acceleration of increasing of hydraulic pressure) based on detection outputs from the first, second and third detecting means so as to allow an electrical command corresponding to the calculated gradient to be inputted into the pressure control valve.

Specifically, the present invention has been made while taking account of a jerk value J serving as a value for evaluating lock-up shock (representative of a rate of variation of acceleration as time elapses). This jerk value J can be expressed by the following equation.

$$J = \frac{d\alpha}{dt} = K \frac{G}{I} \cdot \left( \mu \frac{dp}{dt} + P \frac{d\mu}{dt} \right)$$

where J: jerk value
   α: acceleration of vehicle body
   K: conversion coefficient
   G: constant relative to speed reduction ratio
   I: weight of vehicle (weight of vehicle body + weight of load placed on vehicle body)
   μ: friction coefficient of clutch disc
   P: hydraulic pressure in clutch If the second term in the above equation is neglected, a value derived by differentiating the hydraulic pressure in the clutch with time, i.e., dP/dt can be expressed in the following manner.

$$\frac{dP}{dt} = \frac{1}{K \cdot \mu} \cdot \frac{I \cdot J}{G}$$

In the above equation, since K and μ are a known value, respectively, a characteristic of gradual increasing of hydraulic pressure in the lock-up clutch, i.e., dP/dt can be obtained by I, J and G. Here, if it is assumed that a target jerk value is determined by a quantity of throttle, an optimum dP/dt can be obtained by detecting the quantity of throttle (J), the vehicle weight (I) and the speed reduction ratio (G). Then, an electrical command is inputted into the pressure control valve corresponding to the thus obtained dP/dt, after the hydraulic pressure is gradually increased.

As will be apparent from the above description, according to the present invention, since a rate of increasing of hydraulic pressure in the lock-up clutch is rendered variable depending on the vehicle weight, the throttle quantity and the current speed stage, shock caused by locking-up can be reduced.

Further, according to the present invention, the apparatus is provided with a pressure control valve in operative association with the lock-up clutch so that the pressure control valve is actuated in response to an electrical signal. Thus, the following procedure of processings are executed during speed changing by controlling the pressure control valve.

When speed changing is started, hydraulic pressure in the lock-up clutch is reduced to a predetermined pressure of which value is not zero and then this predetermined pressure is maintained.

Completion of the speed changing is sensed.

After the speed changing is sensed, hydraulic pressure in the lock-up clutch is gradually increased at a predetermined rate of increasing.

An e value of the torque converter is calculated, and the gradual increasing of hydraulic pressure is terminated at the time point when the e value reaches a certain set value.

Further, when the vehicle starts its forward movement, the following procedure of processings are executed.

When a command indicative of forward movement is inputted into the apparatus, hydraulic pressure in the lock-up clutch is held at a high pressure state for a predetermined period of time and thereafter ilt is reduced to a predetermined pressure of which value is not zero so that this predetermined pressure is maintained.

Completion of the filling is sensed.

After completion of the filling is detected, hydraulic pressure in the lock-up clutch is gradually increased at a predetermined rate of increasing.

The e value of the torque converter is calculated and the gradual increasing of hydraulic pressure is completed at the time point when the e value reaches a certain set value.

Further, during running of the vehicle at a normal running speed, output torque from the engine is successively calculated, and in case where it is found that the engine speed is in excess of a minimum engine speed at the time of locking-up, hydraulic pressure in the lock-up clutch is controlled such that it assumes a value of hydraulic pressure corresponding to the calculated value of output torque of the engine or a value of hydraulic pressure corresponding to a value appreciably higher than the calculated value.

In this manner, according to the present invention, during speed changing or at the time of starting of forward movement of the vehicle, hydraulic pressure in the lock-up clutch is gradually increased from such an operatively engaged state that hydraulic pressure in the lock-up clutch is held at a predetermined low pressure without complete releasing of the lock-up clutch from the operatively engaged state. Consequently, shock caused by locking-up during speed changing can be reduced. At this moment, a timing of starting of the gradual increasing of hydraulic pressure is detected so as to allow the gradual increasing of hydraulic pressure to be started in response to the foregoing detection. Further, since hydraulic pressure in the lock-up clutch is reduced to a value approximately corresponding to output torque from the engine during running of the vehicle, transmission of variation of the engine torque can be suppressed, whereby running of the vehicle in the lock-up state can be carried out from a low rotational region with the result that a characteristic of fuel consumption can be improved remarkably.

BEST MODE FOR CARRYING OUT THE INVENTION

Now, the present invention will be described in detail hereinafter with reference to the accompanying drawings which illustrate preferred embodiments thereof.

Figure 1:
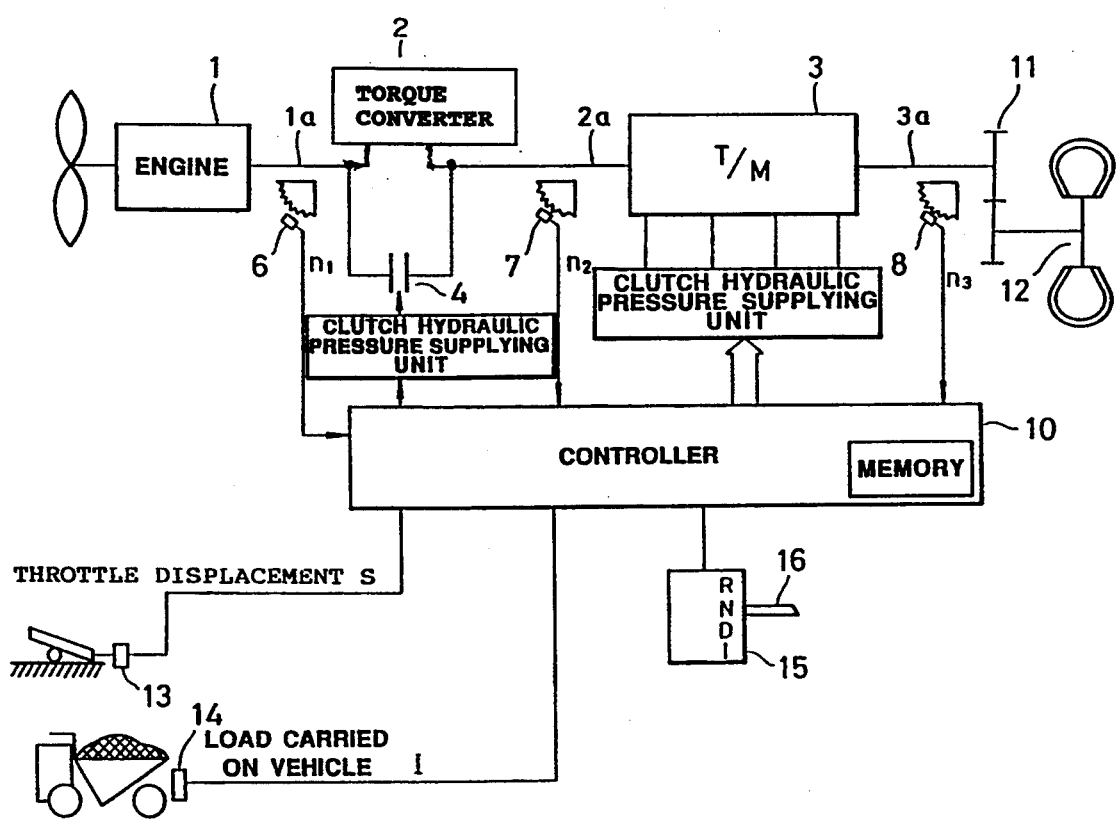
FIG. 1 is a block diagram which schematically illustrate by way of example the structure a speed changing system to which the present invention is applied.

FIG. 1 is a block diagram which schematically illustrates the whole structure of a speed changing system to which the present invention is applied. Output from an engine 1 is transmitted to a transmission 3 via a torque converter 2 and then output from the transmission 3 is transmitted further to driving wheels 12 via a final speed reduction unit 11. As is apparent from the drawing, a lock-up clutch 4 is interposed between input and output shafts of the torque converter 2 for the purpose of making direct operative connection therebeteen.

The engine 1 is equipped with an engine rotation sensor 6 which outputs a signal corresponding to the number $n_1$ of revolutions of the engine 1, while the transmission 3 is equipped with rotation sensors 7 and 8 wherein the rotation sensor 7 outputs a signal corresponding to the number $n_2$ of revolutions of an input shaft 2a of the transmission 3 and the rotation sensor 8 outputs a signal corresponding to the number $n_3$ of revolutions of an output shaft 3a of the transmission 3. These outputs from the sensors 6, 7 and 8 are introduced into a controller 10.

A throttle quantity sensor 13 detects a quantity of depressing of a throttle pedal and then inputs into the controller 10 a signal S indicative of the quantity of depressing of the throttle pedal. A vehicle weight sensor 14 detects a vehicle weight I (representing a sum of weight of a vehicle body and weight of load placed on the vehicle body) and then inputs a detected value into the controller 10. A shift selector 15 inputs into the controller 10 a signal indicative of one of shift positions (R, N, D , 1 ---) selected by a shift lever 16.

Figure 2:
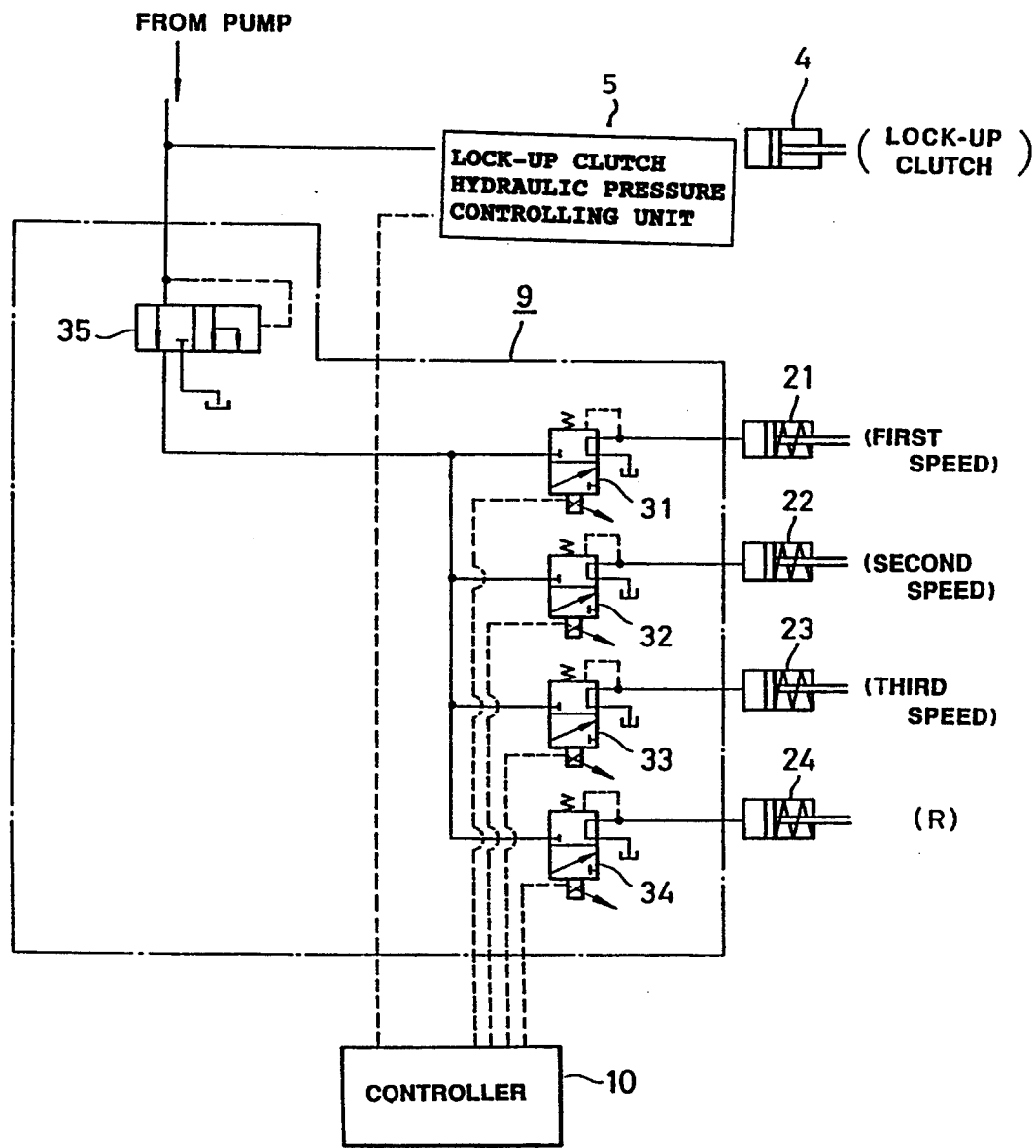
FIG. 2 is a hydraulic circuit diagram which illustrates by way of example the inner structure of an unit for supplying a clutch with hydraulic oil in the speed changing system in FIG. 1.

For example, as shown in FIG. 2, the transmission 3 includes four speed changing clutches 21, 22, 23 and 24, and a required clutch corresponding to a speed stage which has been determined by one of the clutches 21, 22, 23 and 24 is selectively actuated by hydraulic pressure supplied from a clutch hydraulic pressure supplying unit 9 to make operative engagement for the foregoing clutch.

Specifically, as shown in FIG. 2, the clutch hydraulic pressure supplying unit 9 is constituted mainly by separately operable electronic control type pressure control valves 31, 32, 33 and 34 for supplying hydraulic pressure to the four speed changing clutches 21 to 24 to separately actuating them and a relief valve 35.

The lock-up clutch 4 has a lock-up clutch hydraulic pressure supplying unit 5 connected thereto to supply hydraulic pressure to the lock-up clutch 4.

With respect to the speed changing system as constructed in the above-described manner, several embodiments derived from the present invention will be described hereinafter separately as to seven items (1) to (7) as noted below.

(1) structure for carrying out feedback control for hydraulic pressure in the torque converter
(2) off-timing control to be carried out for the lock-up clutch during speed changing
(3) control to be carried out for bringing the lock-up clutch in an operatively engaged state at the time of starting of forward movement of a vehicle
(4) control to be carried out for the lock-up clutch during normal running of the vehicle
(5) control to be carried out for bringing the lock-up clutch in an operatively engaged state during speed changing
(6) feedback of hydraulic pressure in the torque converter + flow rate detecting valve + filling detecting sensor
(7) mechanical modulation structure + half lock-up control to be carried out by a solenoid valve for drainage Description will successively be made while starting from the item (1).

(1) Structure for carrying out feedback control for hydraulic pressure in the torque converter The item (1) is concerned with structure which is made in consideration of the fact that the hydraulic pressure $P_t$ in the torque converter 2 is exerted on the back pressure portion of a piston of the lock-up clutch 4, and this structure will be described in more details below with reference to FIGS. 3 to 5.

Figure 3:
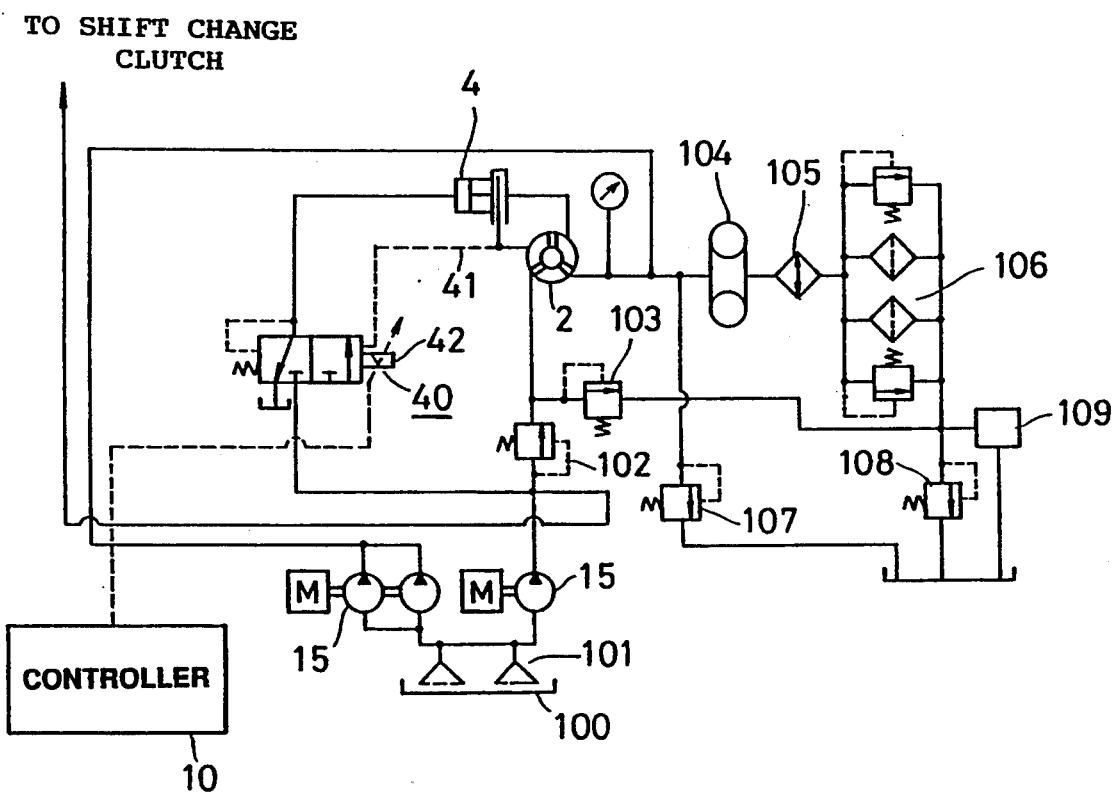
FIG. 3 is a hydraulic circuit diagram which schematically illustrates an apparatus for controlling a lock-up clutch in accordance with an embodiment of the present invention.
Figure 25:
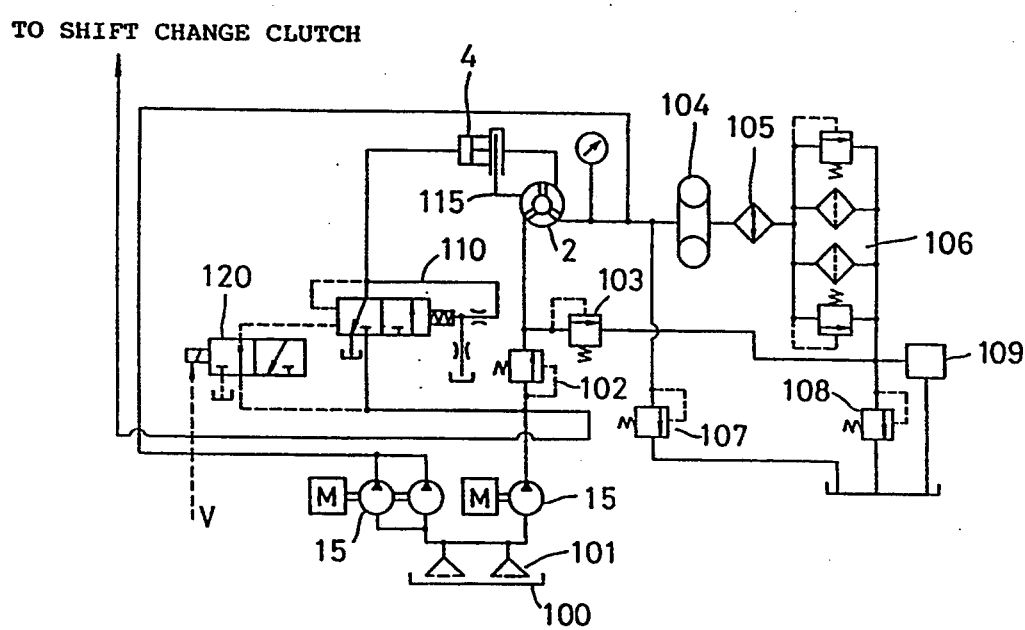
FIG. 25 is a hydraulic circuit diagram which illustrates by way of example a conventional apparatus for controlling a lock-up clutch.
Figure 26:
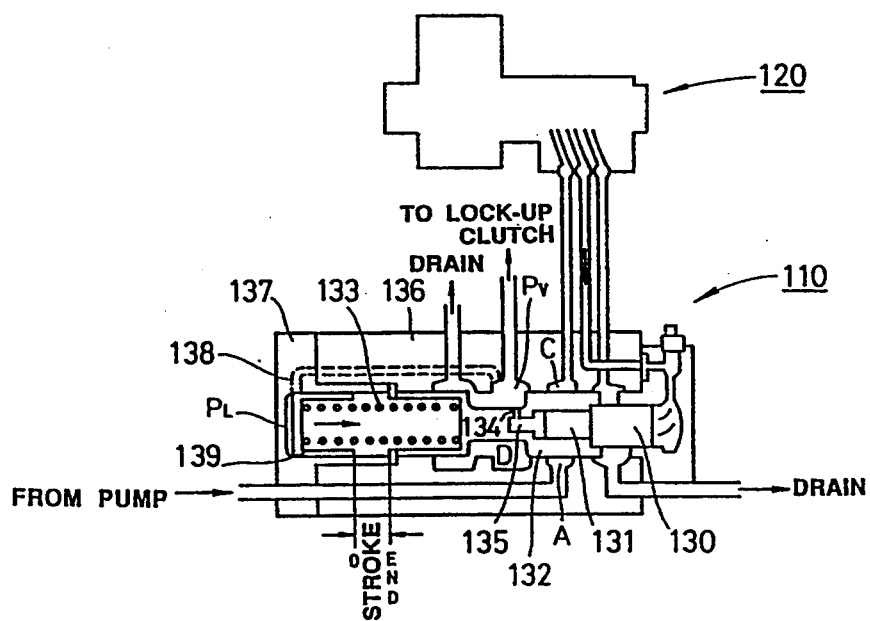
FIG. 26 is a schematic sectional view which illustrates by way of example the inner structure of a pressure control valve for the conventional apparatus.
Figure 27:
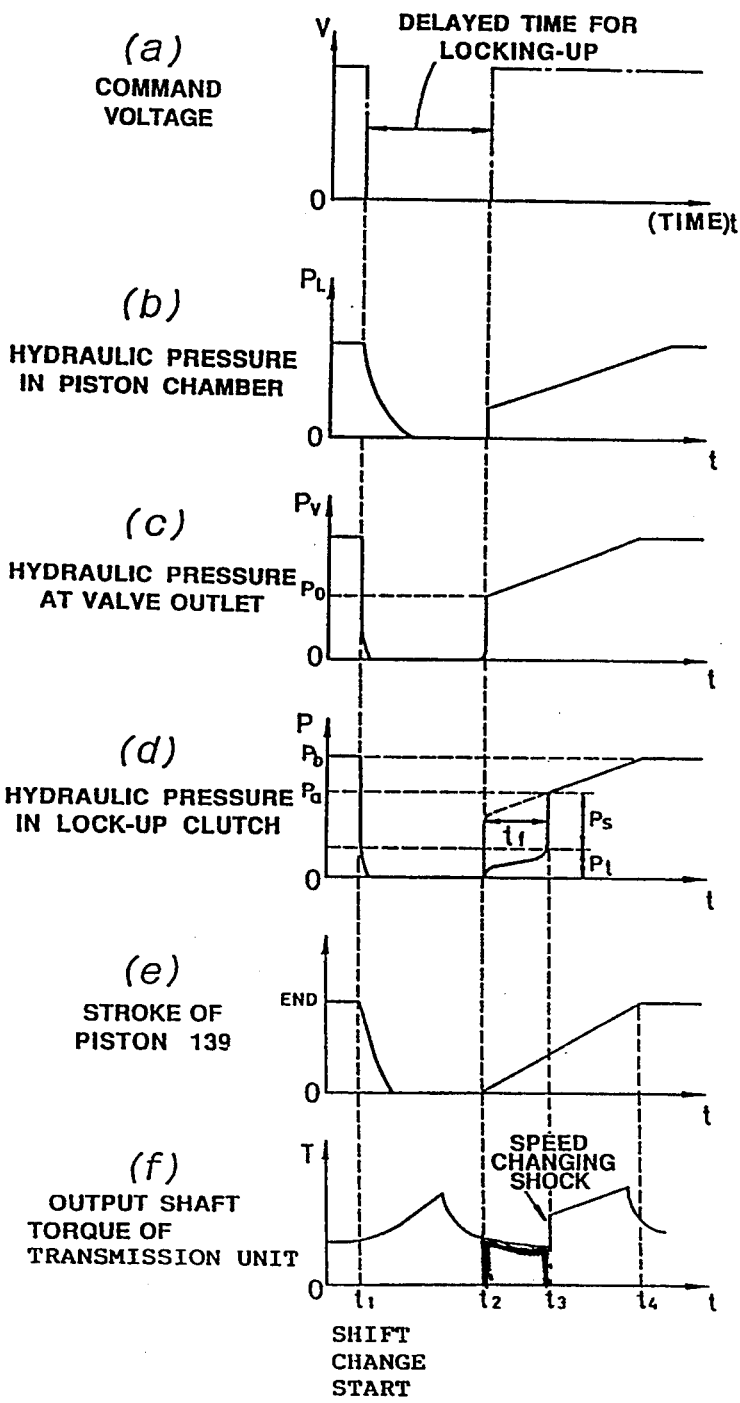
FIGS. 27 and 28 show a plurality of time charts, respectively, which illustrates by way of example operations of the conventional apparatus.
Figure 28:
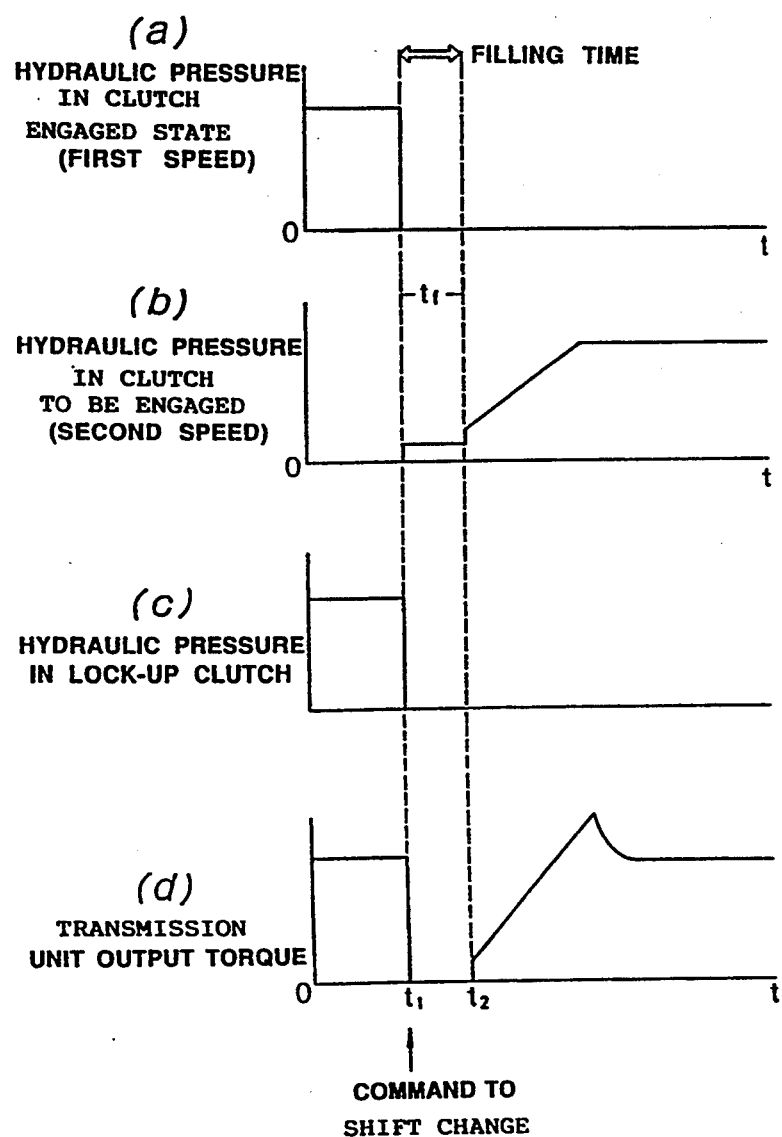
Figure 29:
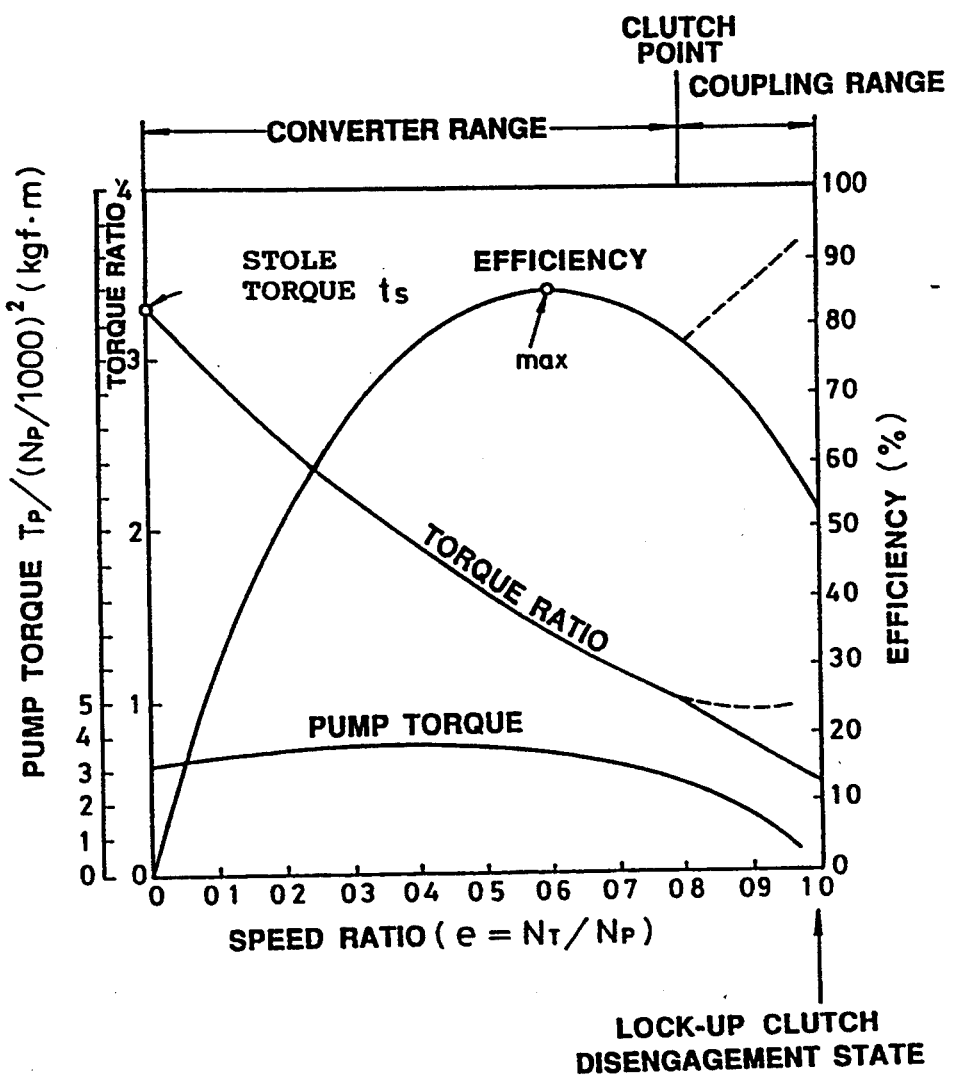
FIG. 29 is a graph which illustrates a characteristic curve of a torque converter for the conventional apparatus.

FIG. 3 is a hydraulic circuit diagram which schematically illustrates by way of example an inner structure of the lock-up clutch hydraulic pressure supplying unit 5. The lock-up clutch hydraulic pressure supplying unit 5 is such that an electronic type pressure control valve 40 is substituted for the lock-up modulation valve 110 and the solenoid valve 120 both of which are shown in FIG. 25. Other components rather than the electronic type control valve 40 are same as those in FIG. 25 and represented by same reference numerals. Thus, repeated description will be neglected for the purpose of simplification.

The electronic type control valve 40 serves as a proportional control valve like the pressure control valves 31 to 34 which are actuated in response to an electronic command outputted from the controller 10. The electronic type control valve 40 is constructed such that hydraulic pressure in the torque converter 2 is fed back to the proportional solenoid 42 side of the pressure control valve 40 via a hydraulic passage 41 so as to prevent an actual initial hydraulic pressure $P_s$ from varying due to variation of the hydraulic pressure in the torque converter 2.

Figure 4:
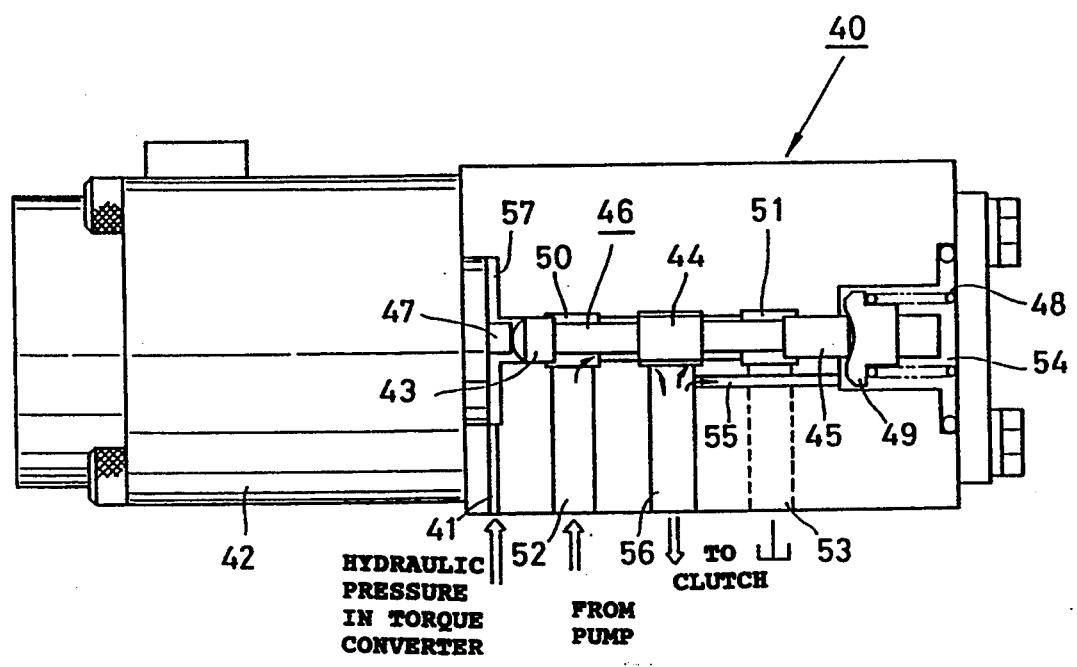
FIG. 4 is a sectional view which illustrates by way of example the inner structure of an electronic type pressure control valve for the apparatus in accordance with the embodiment of the present invention.

FIG. 4 is a partially sectioned view which illustrates by way of example the structure of the control valve 40. It should be noted that the pressure control valves 31 to 34 connected to the speed changing clutches 21 to 24 are constructed in the same structure as the control valve 40. In detail, the pressure control valve 40 includes a spool 46 which comprises a first piston portion 43, a second piston portion 44 and a third piston portion 45. The left-hand end of the spool 46 comes in contact with a plunger 47, while the right-hand end of the spool 46 comes in contact with a retainer 49 which is resiliently energized in the leftward direction by a spring 48.

The first piston portion 43 and the second piston portion 44 define a hydraulic chamber 50 and the second piston portion 44 and the third piston portion 45 define a hydraulic chamber 51. The hydraulic chamber 50 is communicated with an input port 52 and the hydraulic chamber 51 is communicated with a tank port 53.

A hydraulic chamber 54 in which the spring 48 and the retainer 49 are accommodated is communicated with an output port 56 via a hydraulic passage 55. The hydraulic pressure $P_t$ in the torque converter 2 is introduced into a hydraulic chamber 57 located on the proportional solenoid 42 side.

The proportional solenoid 42 is provided to serve as an actuator for displacing the spool 46, and a plunger 47 of the proportional solenoid 46 comes in contact with the left-hand end surface of the spool 46. As is generally known, the proportional solenoid 42 has such a characteristic that a thrust force F of the plunger 47 is in proportion to an input current i.

When the proportional solenoid 42 is actuated and thereby the spool 46 is displaced in the rightward direction, hydraulic oil introduced into the hydraulic chamber 57 via the input port 52 flows in the output port 56. At this moment, a part of the hydraulic oil passing through the output port 56 is introduced into the hydraulic chamber 54 via the hydraulic passage 55.

When it is assumed that a pressure receiving surface area of the third piston portion 45 is represented by $A_a$ and hydraulic pressure in the output port 56, i. e. , hydraulic pressure in the hydraulic chamber 54 is represented by $P_d$. force represented by $A_a \cdot P_d$ is exerted on the spool 46 in the leftward direction.

Thus, the spool 46 is actuated such that the thrust force F of the plunger 47 is balanced with the foregoing force represented by $A_a \cdot P_d$, i.e., a well-balanced relationship as represented by the following equation is satisfactorily established therebetween.

$$F = A a \cdot P d \quad (1)$$

Incidentally, the spring 48 serves to displace the spool 46 in the leftward direction and, since a spring having a small spring constant is used for the spring 48, the foregoing description has been made while not taking account of a function of the spring 48.

As described above, since the following relationship is existent between the thrust force F of the plunger 47 and the driving current i of the solenoid 42, $$F = F \cdot i \quad (2)$$

The following relationship is established based on the Equations (1) and (2).

$$K \cdot i = A a \cdot P d \quad (3)$$

Consequently, the hydraulic pressure $P_d$ in the output port 56 is represented as follows.

$$P d = i \cdot (K/A_a) \quad (4)$$

As is apparent from the Equation (4), the hydraulic pressure $P_d$ in the output port 56 is in proportion to the driving current i of the solenoid 42.

Accordingly, by adequately varying the command signal i outputted from the controller 10, an arbitrary clutch pressure can be exerted on the speed changing clutches 21 to 24 and the lock-up clutch 4.

When the pressure control valve 40 for the lock-up clutch 4 is held in a closed state as shown in FIG. 3, the second piston portion 44 is displaced toward the output port 56 to close the output port 56 with the second piston portion 44, as shown in FIG. 4.

Now, it is assumed that a clutch pack of the lock-up clutch 4 is held in an empty state and the proportional solenoid 42 is turned on in response to an electrical signal from the controller 10 while the foregoing state is maintained. The spool 46 is displaced in the rightward direction under the effect of thrust force of the plunger 47 and thereby the pressure control valve 40 is opened with the result that hydraulic oil in the input port 52 flows in the output port 56, causing the lock-up clutch 4 to be supplied with hydraulic oil. At this moment, a part of the hydraulic oil passing through the output port 56 is introduced into the hydraulic chamber 54 via the hydraulic passage 56.

Figure 5:
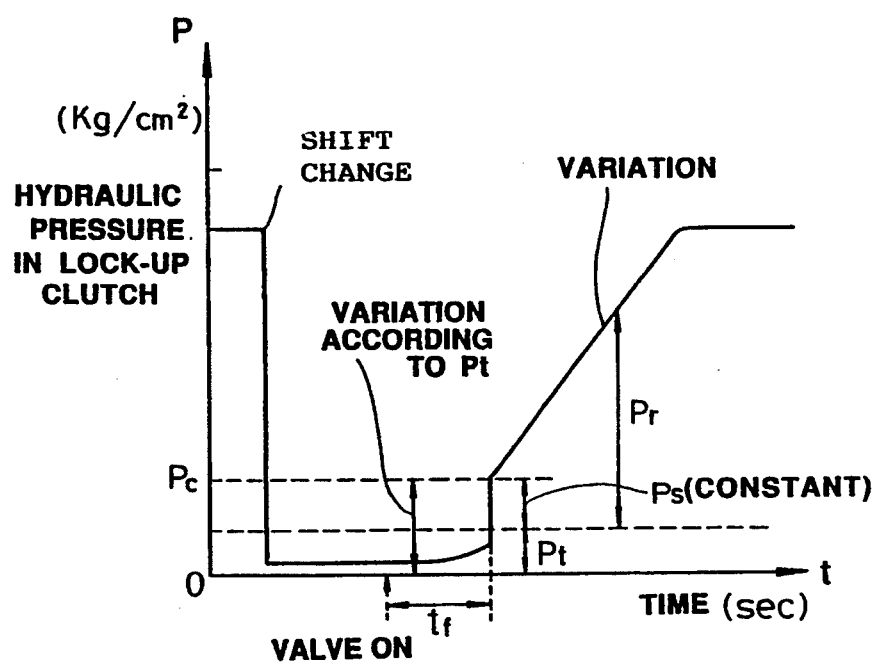
FIG. 5 is a time chart illustrating a characteristic of hydraulic pressure for the clutch for the apparatus in accordance with the embodiment of the present invention.

As is apparent from FIG. 5, hydraulic pressure in the lock-up clutch 4 is reduced to a level of substantially zero for a period of filling time $t_f$ until the clutch pack is filled with hydraulic oil, and thereafter it is raised up to the initial pressure $P_c$ on completion of the filling.

When it is assumed that a pressure receiving surface area at opposite ends of the spool 46 in the pressure control valve 40 is represented by $A_b$ (representing a same pressure receiving surface area at the opposite ends), an initial clutch pressure is represented by $P_c$, hydraulic pressure in the torque converter 2 is represented by $P_t$ and thrust force of the proportional solenoid 42 is represented by F, the following well-balanced relationship is established, because the hydraulic pressure $P_t$ in the torque converter 2 is introduced into the hydraulic chamber 57 on the solenoid 42 side.

$$F + A b \cdot P l = A b \cdot P C \quad (5)$$

Incidentally, the spring 48 serves to displace the spool 46 in the leftward direction, and since a spring having a small spring constant is used for the spring 48, the above Equation (5) has been formulated while not taking account of the function of the spring 48.

The Equation (1) can be transformed in the following manner.

$$Pc = \frac{F}{Ab} + Pt \quad (6)$$

Thus, the lock-up actual initial hydraulic pressure $P_s$ derived by subtracting from the clutch initial pressure $P_c$ the hydraulic pressure $P_t$ in the torque converter 2 exerted on the back pressure portion of the piston of the lock-up clutch 4 can be expressed by the following equation. Consequently, the hydraulic pressure $P_t$ in the torque converter 2 is canceled with the foregoing lock-up actual initial hydraulic pressure $P_s$.

$$Ps = Pc - Pt = \frac{F}{Ab} + Pt - Pt = \frac{F}{Ab} \qquad (7)$$

Now, it is assumed that an engine speed varies and thereby hydraulic pressure in the torque converter 2 is varied from $P_t$ to $P_t'$. At this moment, when the initial clutch pressure is represented by $P_c'$ and the lock-up actual hydraulic pressure is represented by $P_s'$, the following equations are established.

$$Pc' = \frac{F}{Ab} + Pt' \qquad (8)$$

$$Ps' = Pc' - Pt' \qquad (9)$$

Then, the following modified equation is derived from the above Equations (8) and (9).

$$Ps' = \left(\frac{F}{Ab} + Pt'\right) - Pt' = F/Ab \qquad (10)$$

Here, when the thrust force F is equal to ki (where k designates a proportional constant and i designates a solenoid driving current) and the driving current i for the proportional solenoid is kept constant at all times after completion of the tilling, the resultant thrust force F becomes constant, whereby the following equation is established based on the Equations (7) and (10).

$$P\,s = P\,s' \qquad (11)$$

Accordingly, the lock-up actual initial hydraulic pressure $P_s$ is always left unchanged even when the inner pressure in the torque converter 2 is varied from $P_t$ to $P_t'$.

Incidentally, reference has been made only to the actual initial hydraulic pressure $P_s$ appearing at the time point of completion of the filling in the foregoing description. With respect to the lock-up pressure $P_r$ (see FIG. 5) during the gradual increasing of hydraulic pressure after completion of the filling, the same relationship as described above is likewise established but the lock-up hydraulic pressure $P_r$ is not affected by variation of the inner pressure $P_t$ in the torque converter 2.

Specifically, with the electronic type pressure control valve 40 shown in FIGS. 3 and 4, the inner pressure $P_t$ of the torque converter 2 is fed back to the hydraulic pressure 57 on the solenoid 42 side to compensate the hydraulic pressure $P_t$ in the torque converter 2 active on the back pressure portion of the piston of the lock-up clutch 4. Thus, the pressure control valve 40 can suppress variation of the lock-up actual initial hydraulic pressure $P_s$ due to variation of the hydraulic pressure $P_t$ in the torque converter 2. Therefore, there is no need of presetting the initial hydraulic pressure $P_c$ to a higher level while taking account of variation of the hydraulic pressure $P_t$ in the torque converter as is the case with the conventional control system. Thus, the lock-up actual initial hydraulic pressure $P_s$ can assume a constant value at all times and the initial pressure $P_c$ can be maintained at a lower pressure, if the solenoid driving current i at the time point of completion of the filling is determined to hold a constant low pressure.

(2) Off-timing control of the lock-up clutch

Figure 6:
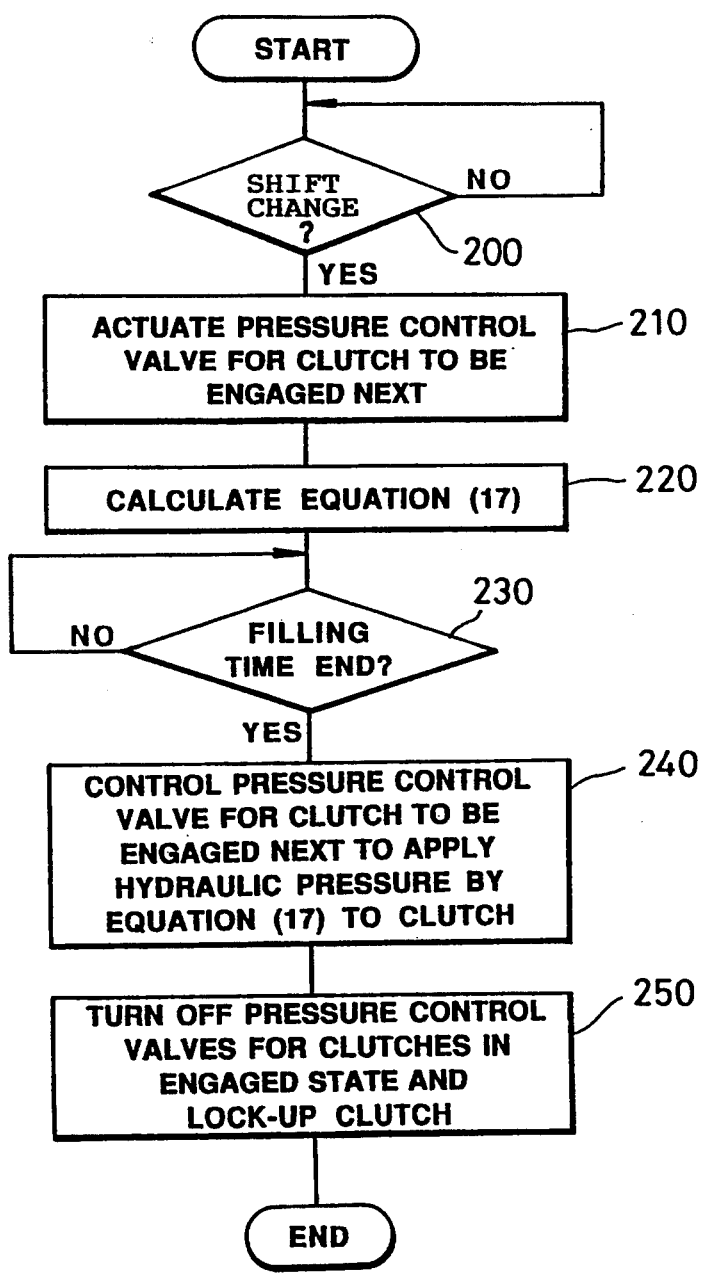
FIG. 6 is a flowchart which schematically illustrates an apparatus for controlling a lock-up clutch in accordance with other embodiment of the present invention.

This item (2) is concerned with timing control to be carried out when the lock-up clutch 4 is turned off during speed changing. Here, operations of the controller 10 will be described with reference to a flowchart in FIG. 6 and and a plurality of time charts in FIG. 7.

The controller 10 determines whether or not speed changing should be performed based on outputs from the rotation sensor 6 and the throttle quantity sensor 13 during running of the vehicle (step 200).

For example, when it is assumed that a first speed is selected by bringing the speed changing clutch 21 shown in FIG. 2 in an operatively engaged state and the controller 10 has determined that a second speed should be selected at the step 200, the controller 10 first actuates the pressure control valve 32 for the second speed clutch 22 (step 210).

Figure 7:
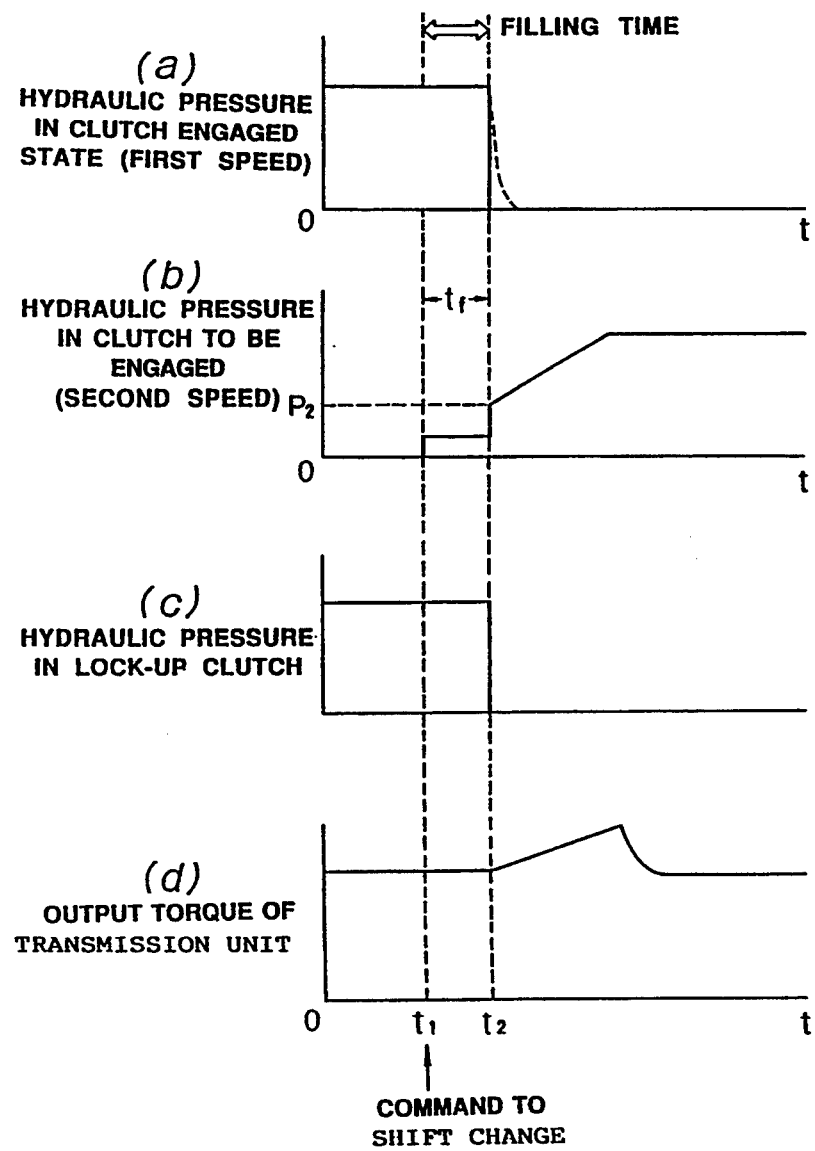
FIG. 7 shows a plurality of graphs which illustrate by way of example variation of hydraulic pressure in a clutch for speed changing and the lock-up clutch with reference to the flowchart in FIG. 6.

When the pressure control valve 32 is actuated (time $t_1$ in FIG. 7), the clutch pack of the clutch 22 is brought in an empty state. This causes the clutch pressure of the clutch 22 to be held at a level of substantially zero until a certain period of time (filling time) $t_f$ elapses after the pressure control valve 32 is actuated, as shown in FIG. 7(b).

Next, the controller 10 calculates a clutch hydraulic pressure $P_2$ to be exerted on the speed changing clutch 22 after the filling time $t_f$ elapses (step 220).

So-called speed changing shock takes place due to difference between output torque from the transmission 3 just prior to speed changing and output torque from the transmission 3 immediately after the speed changing. For the reason, an occurrence of the speed changing shock can be prevented by performing speed changing so as to eliminate the foregoing difference appearing between the foregoing two torques.

When it is assumed that the number of revolutions of the input shaft 1a of the torque converter 2 is represented by $n_1$ and the number of revolutions of the output shaft 2a of the torque converter 2 shown in FIG. 1 is represented by $n_2$, a primary coefficient (STP) and a torque ratio (ST) representative of performances of the torque converter 2 can be calculated by deriving a ratio of the number of revolutions of the input shaft 1a to the number of revolutions of the output shaft 2a of the torque converter 2, i.e., an e value which is equal to $n_2/n_1$. Since a torque converter input torque $T_p$ is represented by the following equation, $$ti\,T\,p = S\,T\,P \cdot (n\,1/1\,0\,0\,0)^2 \qquad (12)$$

and a torque converter output torque $T_t$ is represented by the following equation, $$T\,1 = T\,p \cdot S\,T \qquad (13)$$

a value of the torque converter output torque $T_t$ can be calculated in accordance with the above equations based on the primary coefficient (STP) and the torque ratio (ST).

If the torque converter output torque $T_t$ at the time point $t_1$ of issuance of the speed changing command is derived, the torque $T_B$ on the output shaft of the transmission 3 at the time point $t_1$ can be derived in accordance with the following equation.

$$T\,B = G \cdot T\,t \qquad (14)$$

where G designates a gear ratio of the whole transmission 3.

On the other hand, a frictional torque of the clutch at the time point $t_2$ of completion of the filling, i.e., a friction torque $T_c$ on the second speed clutch 22 to be next brought in an engaged state, at the time point $t_2$ of completion of the filling is represented by the following equation.

$$T_c \times K_c \mu \cdot P \qquad (15)$$

where $K_c$ designates a clutch friction coefficient at the time of completion of the filling, designates a clutch friction coefficient at the time of completion of the filling which is a function of the relative rotational speed V of clutch discs and P designates a hydraulic pressure in the clutch.

The friction torque $T_c$ can be converted into a torque TA on the output shaft of the transmission 3 at the time point $t_2$ of completion of the filling by calculation to be carried out in accordance with the following Equation (16).

$$\begin{aligned} TA &= G' \cdot Tc \\ &= Kc \cdot \mu \cdot G' \cdot P \end{aligned} \qquad (16)$$

where g' designates a gear ratio between the clutch to be brought in an operatively engaged state at the time of completion of the filling (second speed clutch) and the output shaft of the transmission.

To prevent variation of the torque during speed changing, it is required that the torque TB on the output shaft of the transmission just prior to speed changing represented by the Equation (14) is equal to the torque TA on the output shaft of the transmission at the time of completion of the filling. Hydraulic pressure in the clutch to be brought in an operatively engaged state (second speed clutch) when a requirement for the condition of TB=TA is satisfied is represented by the following equation with reference to the Equations (14) and (16).

$$P = (G \cdot Tt)/(K_c \mu \cdot G') \qquad (17)$$

It should be noted that the clutch friction coefficient in the above Equation (17) is a function of the number of revolutions of the clutch disc and therefore it is impossible to previously know it. However, the number of relative revolutions of the friction discs at the time of completion of the filling can be derived from the number $n_2$ of revolutions of the output shaft of the torque converter detected by the rotation sensor 7, a gear ratio of the transmission 3 between before and after the speed changing and the number $n_3$ of revolutions of the output shaft of the transmission detected by the rotation sensor 8. This makes it possible to derive the clutch friction coefficient at the time of starting of the speed changing.

Referring to FIG. 6 again, at the step 220, the controller 10 calculates hydraulic pressure $P_2$ to be used for the speed changing clutch 32 based on the Equation (17).

Next, the controller 10 determines whether the filling time is terminated or not (step 230). In this case, the determination on termination of the filling time is made using a timer (not shown). Alternatively, in view of the phenomenon that flowing of hydraulic oil, e,g., in the speed changing clutch 22 is substantially interrupted, termination of the filling time may be detected by a sensor which is disposed midway of a hydraulic pressure supplying passage to sense the foregoing phenomenon.

When the controller 10 has determined at the step 230 that the filling time is terminated, the controller 10 transmits a control signal to the pressure control valve 32 so as to allow the clutch hydraulic pressure $P_2$ derived at the step 220 to be exerted on the speed changing clutch 22 (step 240). Further, the controller 10 turns off the pressure control valve 31 operatively associated with the speed changing clutch 21 for the first speed which has been currently brought in an operatively engaged state, at the time point $t_2$ of termination of the filling time. In addition, the controller 10 outputs a lock-up stop command to the pressure control valve 40 connected to the lock-up clutch 4 at the time point $t_2$, of termination of the filling time to turn off the lock-up clutch 4 (step 250).

After the time point $t_2$, hydraulic pressure in the speed changing clutch 22 is gradually increased until it is maintained at a preset pressure.

According to the control system of the present invention, as shown in FIG. 7(c), the controller 10 turns off the lock-up clutch 4 at the time point $t_2$ of termination of the filling time in the above-described manner. This makes it possible to avoid a malfunction that output torque from the transmission 3 is reduced to zero due to arrangement of the torque converter 2 for the period of filling time as is the case with the conventional control system which turns off the lock-up clutch at the time point $t_1$ of outputting of a speed changing command.

Further, according to the control system of the present invention, as shown in FIG. 7(b), the clutch hydraulic pressure $P_2$ derived at the step 220 is exerted on the speed changing clutch 22 for second speed at the time point $t_2$ of completion of the filling. Thus, as shown in FIG. 7(d), torque on the output shaft of the transmission 3 just before speed changing becomes equal to torque on the output shaft of the transmission at the time of completion of the filling, whereby an occurrence of the speed changing shock can be prevented effectively.

When the lock-up clutch 4 is turned off at the time point $t_2$, it seems that in practice a ratio of speed of a pump to speed of a turbine in the torque converter 2 is momentally changed to 1 and thereby a moment in which no torque is transmitted exists. However, at the time point $t_2$, the first speed clutch is turned off and the second speed clutch starts its operative engagement. Thus, since inertia energy in the transmission is consumed for operative engagement of the second speed clutch, in practice there exists no time in which torque transmission is interrupted. Since speed of the turbine in the torque converter 2 is rapidly decreased due to load when the second speed clutch starts its operative engagement, torque is exchanged between the pump and the turbine in the torque converter immediately after the time point $t_2$.

According to the control system of the present invention, as shown by a dotted line in FIG. 7(a), hydraulic pressure in the speed changing clutch 21 for first speed is transiently decreased after the pressure control valve 22 is turned off. Accordingly, there arises an operative state that the second speed clutch 22 starts its operative engagement before the first speed clutch 21 becomes inoperative, and this may cause variation of torque to some extent. To prevent such phenomenon from taking place, as shown in FIG. 8(a), it will suffice that hydraulic pressure exerted on the first speed clutch 21 is previously decreased to a properly determined level of $P_1$ for the period of time from the time point $t_1$ when a speed changing command is issued till the time point $t_2$ when the second speed clutch 22 starts operative engagement and then hydraulic pressure in the first speed clutch 21 is reduced to zero at the time point $t_2$. It should be noted that the hydraulic pressure $P_1$ may assume any value which assures that a value of output torque for the period of filling time between the time point $t_1$ and the time point $t_2$ shown in FIG. 7(b) can be maintained. A value indicative of the hydraulic pressure $P_1$ can be derived in accordance with the Equations (14) and (16).

Figure 9:
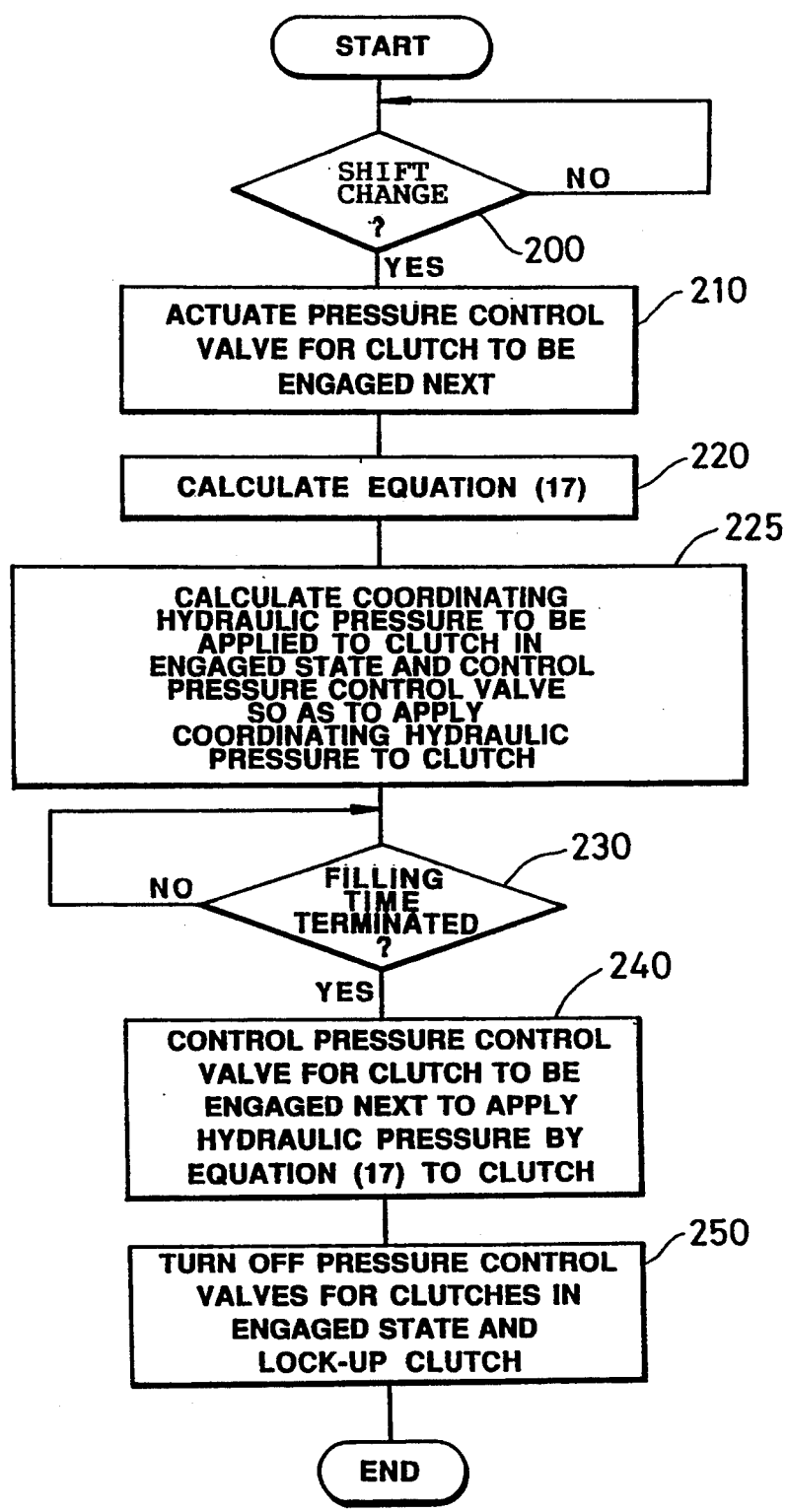
FIG. 9 is a flowchart which illustrates operations of the apparatus shown by the graphs in FIG. 8.

FIG. 9 illustrates a procedure of processings to be performed in the above-described manner. According to this procedure, a step 225 is executed between the step 220 and the step 230 shown in FIG. 6. Specifically, at the step 225, the controller 10 calculates a hydraulic pressure $P_1$ to be exerted on the speed changing clutch 21 which has been currently brought in an operatively engaged state, for the period of time between the time point $t_1$ and the time point $t_2$ and controls the pressure control valve 31 so as to allow hydraulic pressure in the clutch 21 to reach the calculated hydraulic pressure $P_1$.

In this case, e.g., the following two methods of varying hydraulic pressure in the speed changing clutch 21 by actuating the pressure control valve 31 are available. One of them is such that clutch hydraulic pressure is varied to the hydraulic pressure $P_1$ immediately after issuance of a speed changing command, as represented by solid lines in FIG. 8(a). The other one is such that hydraulic pressure is gradually varied to the hydraulic pressure $P_1$ after issuance of the speed changing command, as represented by a dotted line in FIG. 8(a). It should of course be understood that the hydraulic pressure $P_1$ in the speed changing clutch 21 is not necessarily identical to the hydraulic pressure $P_2$ with which the speed changing clutch 22 starts its operative engagement.

According to this procedures of processings to be performed, the lock-up clutch 4, of course, is turned off at the time point $t_2$ when the filling time is terminated, as shown in FIG. 8(c).

Figure 8:
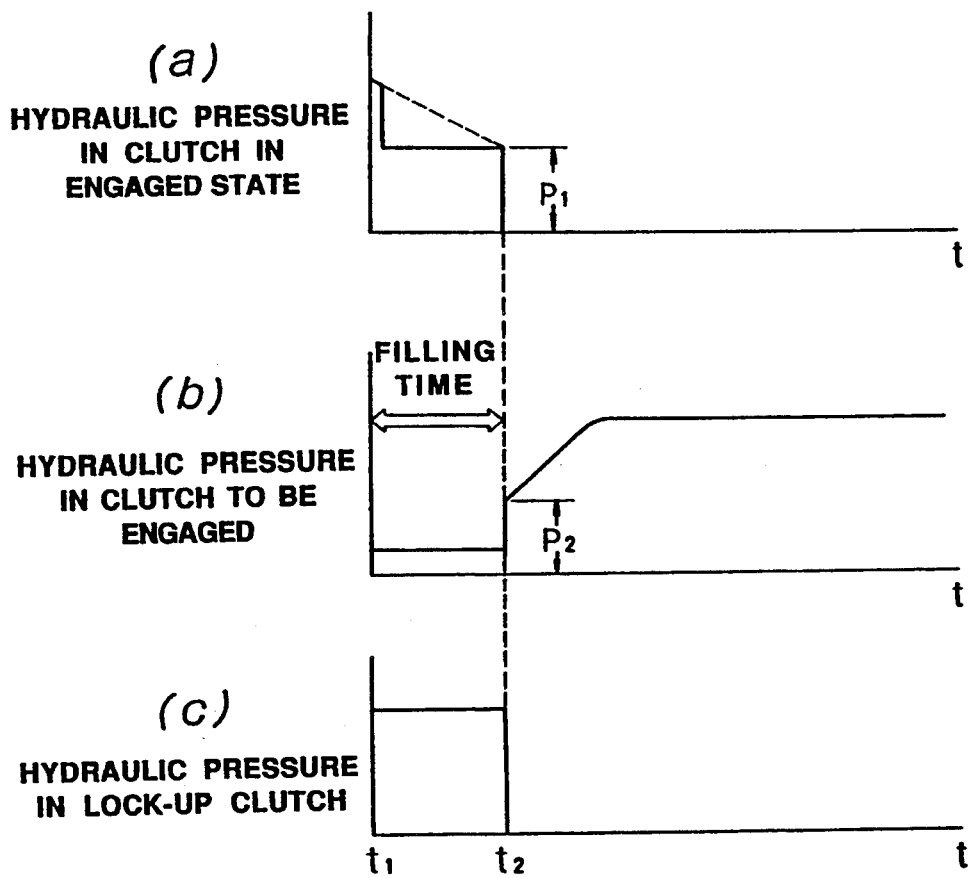
FIG. 8 shows a plurality of graphs which illustrate by way of example variation of hydraulic pressure in a clutch for speed changing and a lock-up clutch in accordance with another embodiment of the present invention.

In detail, according to the control system as shown in FIGS. 8 and 9, hydraulic pressure in the clutch which has been brought in an operatively engaged state is decreased to an adequate level for the period of time until the filling time is terminated and the hydraulic pressure in the clutch is then reduced to zero when the filling time is terminated, whereby variation of torque caused when a next clutch starts its operative engagement can be prevented with higher accuracy.

It should be noted that when the controller 10 performs calculation for the Equation (17), output torque $T_t$ from the torque converter 2 may be derived based on output torque from the engine 1 utilizing the previously known performances of output from the engine 1 or it may be derived directly by using a torque sensor.

Figure 10A:
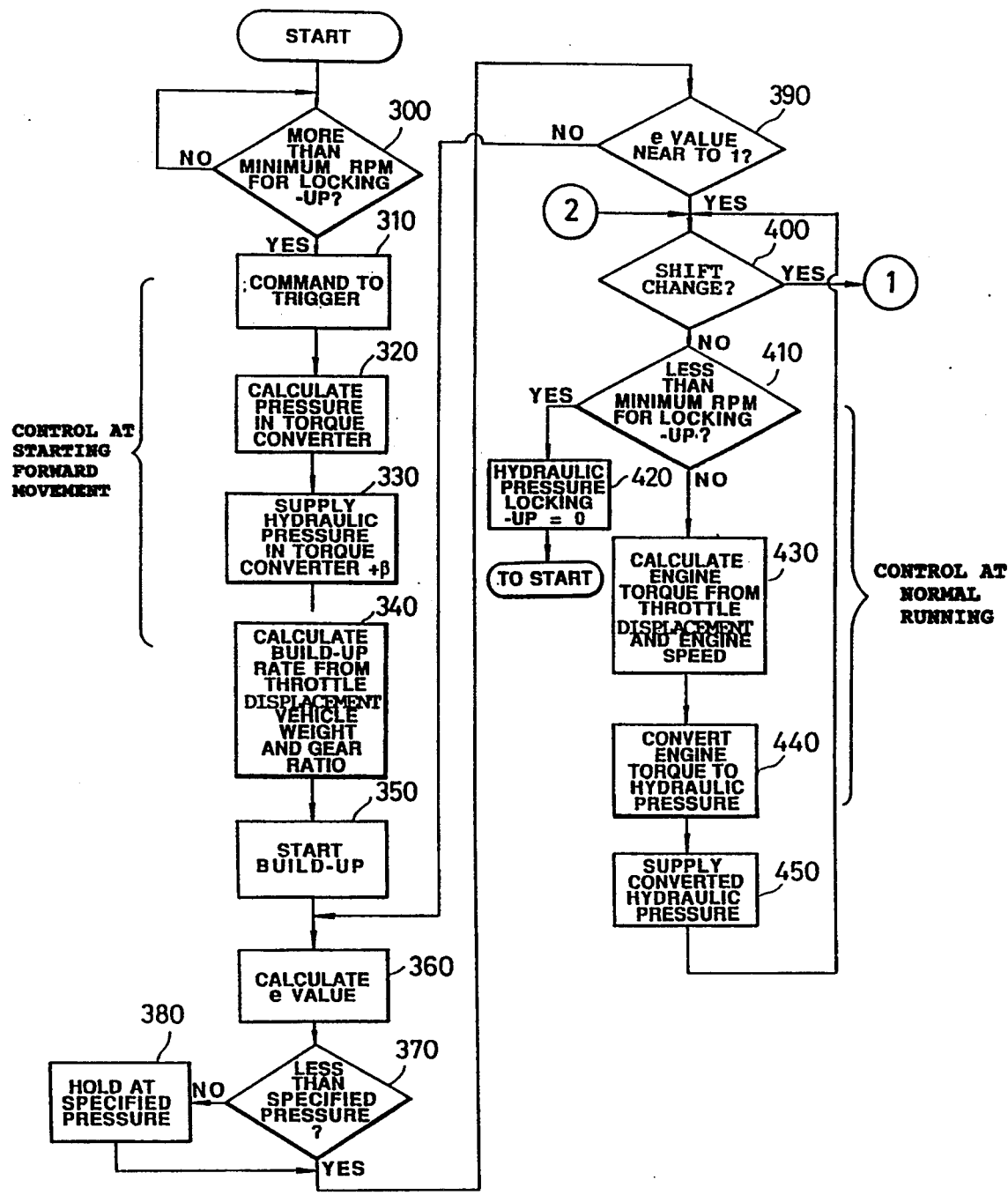
FIG. 10 is a flowchart which illustrates operations of the apparatus in accordance with further another embodiment of the present invention.
Figure 11:
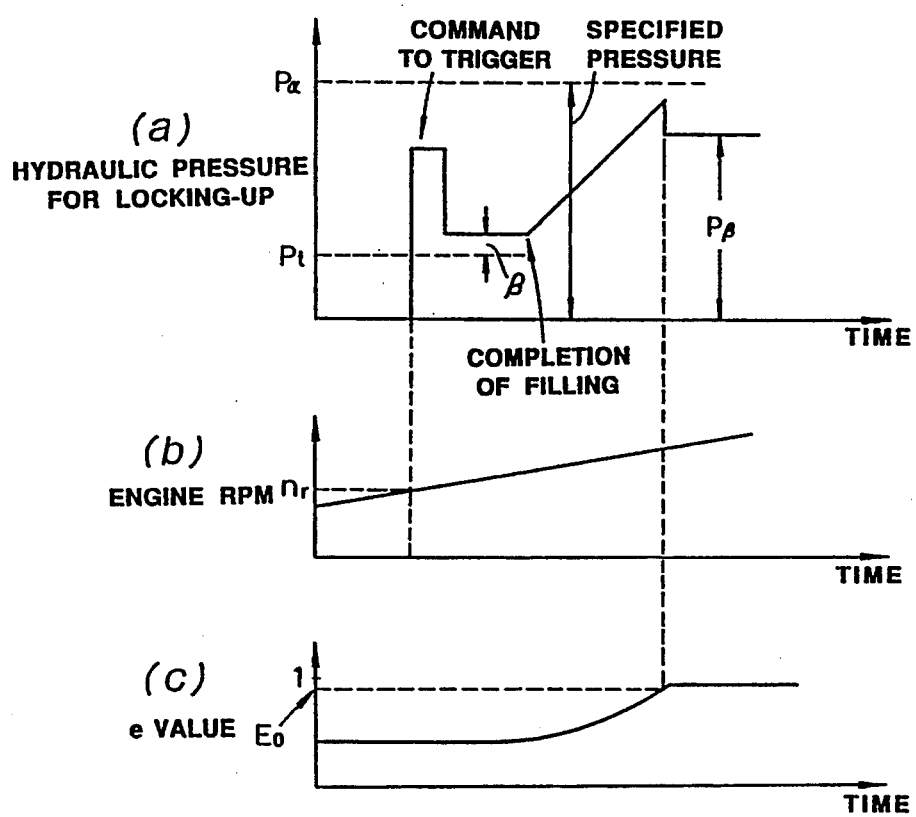
FIG. 11 shows a plurality of time charts illustrating behaviors of each section in the apparatus at the time of starting of forward movement of a vehicle.

(3) Control to be carried out for bringing the lock-up clutch in an operatively engaged state at the time of starting of forward movement of the vehicle The item (3) is concerned with a control for modulating hydraulic pressure when the number of revolutions of the engine exceeds the minimum number of revolutions of the engine required for lock-up engagement after the vehicle starts its forward movement in response to a command issued by actuation of the shift lever 16. This control will be described below with reference flowcharts in FIGS. 10(a) and (b) and a plurality of time charts in FIG. 11 illustrating characteristics relative to a command indicative of hydraulic pressure for locking-up or the like issued as time elapses.

After the vehicle starts its forward movement, the controller 10 measures the number $n_1$ of revolutions of the engine based on output from the engine rotation sensor 6. When the number $n_1$ of revolutions of the engine exceeds the minimum number $n_r$ of revolutions of the engine (see FIG. 11(b)) required for locking-up (step 300), a trigger command indicative of high pressure is inputted in the solenoid 42 of the pressure control valve 40 for the lock-up clutch 4 for a predetermined period of time, whereby high pressure hydraulic oil is supplied to the lock-up clutch 4 to promote a processing of filling (step 310). Thereafter, to fully complete the filling, a command indicative of hydraulic pressure is lowered to a value corresponding to hydraulic pressure $(P_t+)$ higher than the hydraulic pressure in the torque converter 2 and this value is then maintained for a predetermined period of time (steps 320 and 330). In this case, the reason why the lock-up clutch 4 is supplied with hydraulic pressure higher than the hydraulic pressure in the torque converter 2 in that way consists in that the hydraulic pressure in the torque converter 2 is exerted on the back pressure portion of a piston of the lock-up clutch 4. In case where the above-described structure is not employed, it is natural that there is no need of taking account of the above-described arrangement. Since the hydraulic pressure in the torque converter 2 is substantially in proportion to the number of revolutions of the engine, it can be calculated based on outputs from the engine rotation sensor 6 and other sensors. Incidentally, in case where the number of revolutions of the engine varies few, a predetermined intensity of hydraulic pressure (corresponding to a value of the upper limit of variation) may be exerted on the lock-up clutch 4.

Next, when the controller 10 confirms completion of the filling by carrying out control as time elapses or on the basis of outputs from a suitable filling detecting sensor and other sensors, the controller 10 gradually increases a command indicative of hydraulic pressure to be supplied to the pressure control valve 40 so as to allow the lock-up clutch 4 to be brought in an operatively engaged state, whereby hydraulic pressure in the lock-up clutch 4 can be increased gradually. At this moment, a gradient of increasing of hydraulic pressure varies in dependence on an extent S of opening of the throttle and the weight I of the vehicle body. Usually, lock-up engagement at the time of starting of forward movement of the vehicle is accomplished at the minimum speed stage. When the lock-up engagement is accomplished at other speed stage, a speed reduction ratio is added to the aforementioned parameters and then a build-up rate is properly varied in dependence on these parameter (vehicle weight, extent of opening of throttle and gear ratio) (step 340).

Shock caused by speed changing on a gear type transmission is evaluated using a jerk value J which is defined in accordance with the following equation.

$$J = \frac{d\alpha}{dt} = K\frac{G}{I} \cdot \left( \mu \frac{dp}{dt} + P \frac{d\mu}{dt} \right) \tag{18}$$

where J : jerk value $\alpha$: acceleration of vehicle body
K : conversion coefficient
G : constant relative to speed reduction ratio
I : weight of vehicle (weight of vehicle body + weight of load placed on vehicle body)
$\mu$: friction coefficient of clutch disc
P : hydraulic pressure in clutch The constant G relative to a speed reduction ratio is determined in dependence on the current speed stage but it includes a coefficient suggestive of the number of clutch plates superposed one above another and an area of respective clutch plate at individual speed stage. Therefore, this constant G has a value which differs to some extent depending on respective speed stage. Of course, in case where the number of clutch plates superposed one above another and an area of each clutch plate are same at respective speed stage, the constant G designates a speed reduction ratio itself.

The second term $$P \frac{d\mu}{dt}$$

included in the bracket in the Equation (18) represents a term which is related to a case where there is a large magnitude of difference between static friction and dynamic friction. This term is largely affected at the time of completion of the operative engagement of the clutch but it may be neglected if it is found that there is no difference between the static friction and the dynamic friction.

Description will be hereinafter made while not taking the second term into account.

For the above-described reason, the jerk value in the Equation (18) may be expressed by the following equation.

$$J = K \frac{G}{I} \cdot \mu \cdot \frac{dp}{dt} \qquad (19)$$

A resolution dp/dt to be derived based on the Equation (19) will be represented as follows.

$$\frac{dp}{dt} = \frac{1}{K \cdot \mu} \cdot \frac{I \cdot J}{G} \qquad (20)$$

Referring to the Equation (20), since K and $\mu$ are a known value, respectively, it will suffice that only I, J and G are derived.

In practice, I, i.e., the weight of the vehicle can be obtained from an output from the vehicle weight sensor 14 and G, i.e., the constant relative to a speed reduction ratio can be obtained from the speed reduction ratio itself. On the other hand, J, i.e., the jerk value represents a value indicative of shock to be used as a target. This value is determined by a magnitude of load (a smaller value is preferable for light load and a larger value is preferable for heavy load). Since load exerted on the vehicle body can not practically be measured but it is in proportion to power generated by the engine, the above target jerk value J can be determined based on the current extent of opening of the throttle. Namely, the jerk value J can be determined based on an output from the throttle quantity sensor 13. Incidentally, the jerk value J can be changed in proportion to the output from the throttle quantity sensor 13.

In this manner, the controller 10 measures the extent of opening of the throttle, the vehicle weight and the gear ratio and calculates the optimum build-up rate dp/dt so as to gradually increase hydraulic pressure based on the calculated dp/dt. Alternatively, dp/dt may previously be stored in a memory of the controller 10 using the extent of opening of the throttle, the vehicle weight and the gear ratio as variables, so as to allow dp/dt corresponding to detected values of these variables to be read from the memory, as required. Additionally, data derived from actual measurements conducted with an actual vehicle may be used.

After the hydraulic pressure is gradually increased, the controller 10 measures an e value of the torque converter 2 (step 360) ( the e value is represented $n_2/n_1$, wherein $n_1$ designates the number of revolutions of an input shaft of the torque converter 2 and $n_2$ designates the number of revolutions of an output shaft of the torque converter 2). When the e value becomes "1" or a predetermined value "$E_o$" very near to 1 (see FIG. 11 (c)), the gradual increasing of hydraulic pressure is terminated (step 390) . If the hydraulic pressure in the lock-up clutch 4 exceeds the preset pressure $P_a$ indicative of the upper limit during the gradual increasing of hydraulic pressure before the e value reaches "1" or the preset value E (see FIG. 11(a)), the controller 10 carries out control such that the hydraulic pressure in the lock-up clutch 4 is maintained at the upper limit indicative of the preset pressure $P_a$ for a certain period of time until the e value reaches $E_o$ (steps 370 and 380). It should be added that once the e value is obtained, the number of revolutions of the output shaft of the torque converter 2 may be derived using output from the transmission output shaft rotation sensor 8 and the gear ration.

(4) Control to be carried out for hydraulic pressure in the lock-up clutch during normal running of the vehicle during normal running of the vehicle The item (4) is concerned with control to be carried out during normal running of the vehicle after speed changing or starting of forward movement of the vehicle.

When control for gradually increasing hydraulic pressure is terminated, the controller 10 carries out control such that hydraulic pressure in the torque converter 2 is reduced to a value corresponding to output torque from the engine or a value $P\beta$ appreciably larger than the first-mentioned value (see FIG. 11(a)).

Specifically, the controller 10 determines at a step 400 whether speed changing should be effected or not. Thereafter, when the controller 10 determined that speed changing should not be effected, it calculates torque T generated by the engine 1 based on the output S from the throttle quantity- sensor 13 and the output $n_1$ from the engine rotation sensor 6, as long as the number $n_1$ of revolutions of the engine is decreased smaller than the minimum number $n_2$ of revolutions of the engine required for establishing a lock-up state (step 430).

Figure 12:
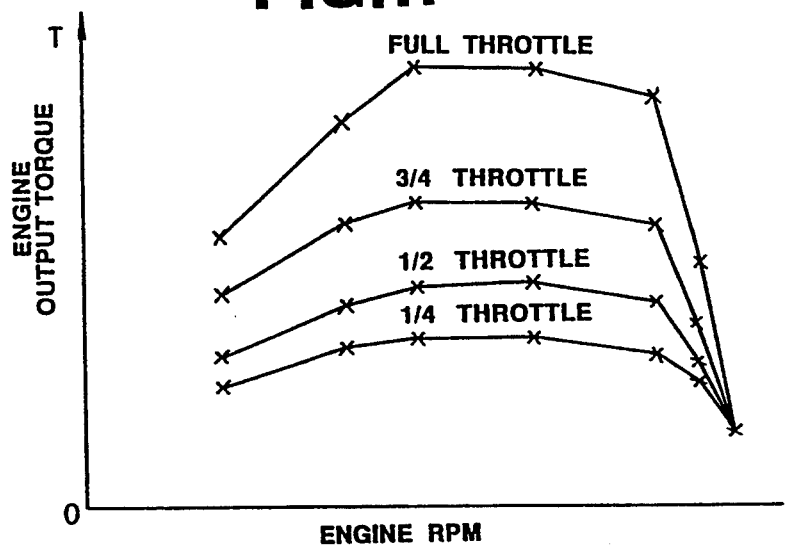
FIG. 12 shows a plurality of graphs illustrating a relationship among the number of revolutions of an engine, a quantity of throttle and output torque from the engine.

As shown in FIG. 12, the torque T outputted from the engine is closely related to the number of revolutions of the engine 1 and the extent of opening of the throttle, and various values of torque T corresponding to respective values of these parameters are previously stored in the memory of the controller 10. Thus, the current engine torque T can be derived by reading from the memory the torque value corresponding to detection outputs from the engine rotation sensor 6 and the throttle quantity sensor 13. In practice, since values completely coinciding with the previously stored parameter values are not necessarily inputted from the respective sensors, intermediate adequate values are derived using a processing of interpolation or the like. Then, the controller 10 controls clutch hydraulic pressure such that the torque transmitted by the lock-up clutch 4 coincides with the engine output torque T derived from the number of revolutions of the engine and the extent of opening of the throttle or the torque transmitted from the lock-up clutch 4 assumes a value appreciably larger than the engine output torque T.

Here, the torque T' transmitted from the lock-up clutch 4 can be expressed by the following equation.

$$T' = K \cdot \mu(v) \cdot P \quad (21)$$

where K: clutch coefficient
$\mu(v)$: friction coefficient of clutch
P: clutch pressure Therefore, the engine output torque T can be converted into the clutch pressure P by deriving the clutch pressure P at which a relationship of T=T' is established based on the above Equation (21).

Namely, the controller 10 derives the engine torque T from outputs from the throttle quantity sensor 13 and the engine rotation sensor 6, converts the derived torque value T or the value appreciably larger than the latter into a clutch pressure P in accordance with the Equation (21) (step 440) and then delivers a hydraulic pressure command corresponding to the converted clutch pressure P to the pressure control valve (step 450).

Figure 13:
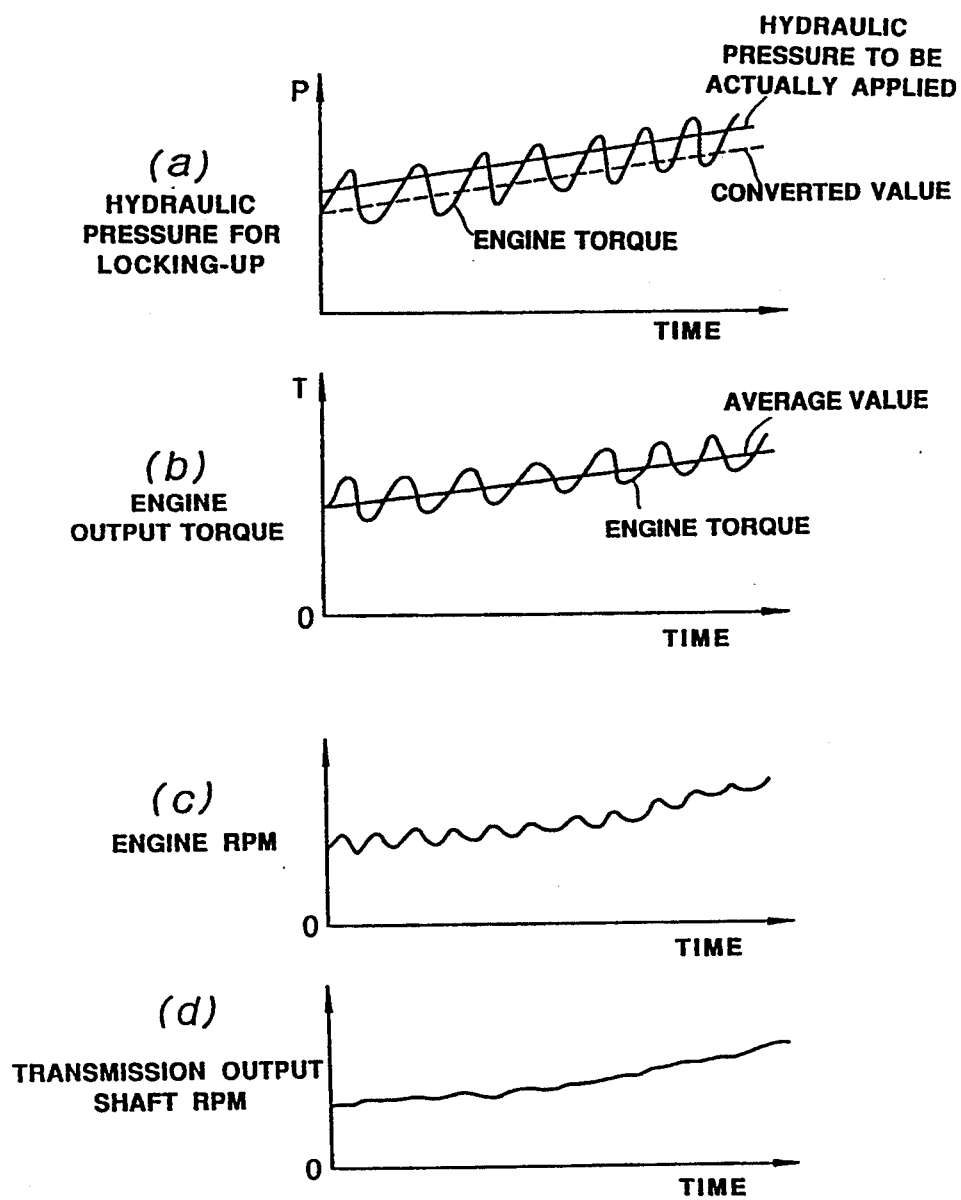
FIG. 13 shows a plurality of time charts illustrating behaviors of each section in the apparatus during running of the vehicle.

During running of the vehicle, the engine output torque T varies as shown in FIG. 13(b). According to the above-described control, however, since the vehicle runs while the lock-up clutch pressure is reduced to the converted value derived by converting the engine output torque into hydraulic pressure (represented by a dotted line in FIG. 13(a)) or to hydraulic pressure appreciably larger than the converted value (represented by a solid line in FIG. 13(a)), variation of output on the transmission output shaft due to variation of engine output torque can be reduced, whereby variation of output of the transmission output shaft can be suppressed as shown in FIG. 13(d), even when a large magnitude of variation is caused with the number of revolutions of the engine as shown in FIG. 13(c). Accordingly, the minimum number $n_r$ of revolutions of the engine relative to the lock-up engagement can be set to the lower speed side than the conventional apparatus, resulting in a property of fuel consumption being improved.

Incidentally, according to the above-described embodiment, the clutch hydraulic pressure is reduced to a level of the value $P\beta$ corresponding to the engine output torque without delay when the e value of the torque converter reaches the present value $E_o$. Alternatively the clutch hydraulic pressure may be reduced to a level of the foregoing value $P\beta$ after a predetermined period of time elapses, after hydraulic pressure is gradually increased and then the corresponding time measurement is carried out.

(5) Control to be carried out for bringing the lock-up clutch in an operatively engaged state during speed changing Control relative to the item (5) is carried out during speed changing for the vehicle.

During speed changing with the conventional apparatus, to reduce a load to be carried by the speed changing clutch, the speed changing clutch is brought in operative engagement after the lock-up clutch is completely released from the operative state. According to the present invention, however, the lock-up clutch is not completely released from the operative state during the speed changing for the vehicle but half lock-up control is executed for gradually increasing hydraulic pressure after possibly low hydraulic pressure above the hydraulic pressure in the torque converter is maintained. Accordingly, during a controlling operation according to the present invention, there does not exist filling time required for fully filling the clutch pack with hydraulic oil.

Figures 14, 15:
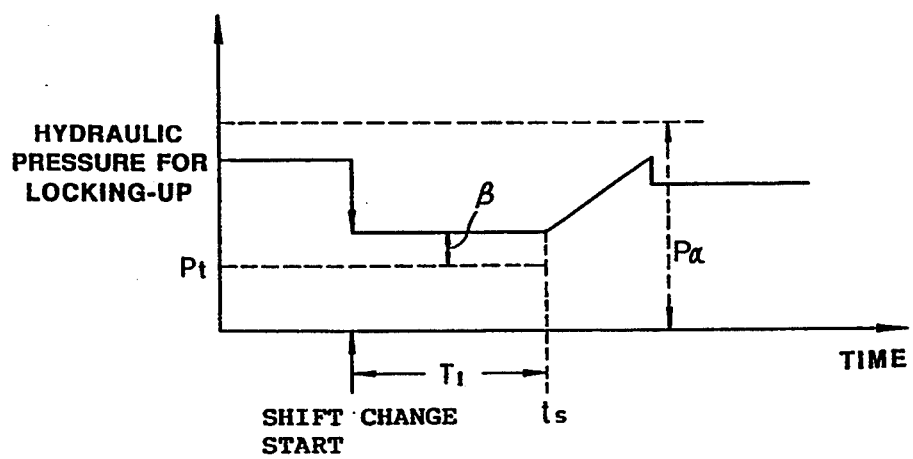
FIG. 14 is a time chart illustrating a command indicative of hydraulic pressure in the lock-up clutch.
FIG. 15 is an explanatory view schematically illustrating one method of determining a timing for starting build-up.

FIG. 14 is a diagram which illustrates variation of characteristics of a command indicative of lock-up hydraulic pressure during the speed changing of the vehicle as time elapses.

Figure 10B:
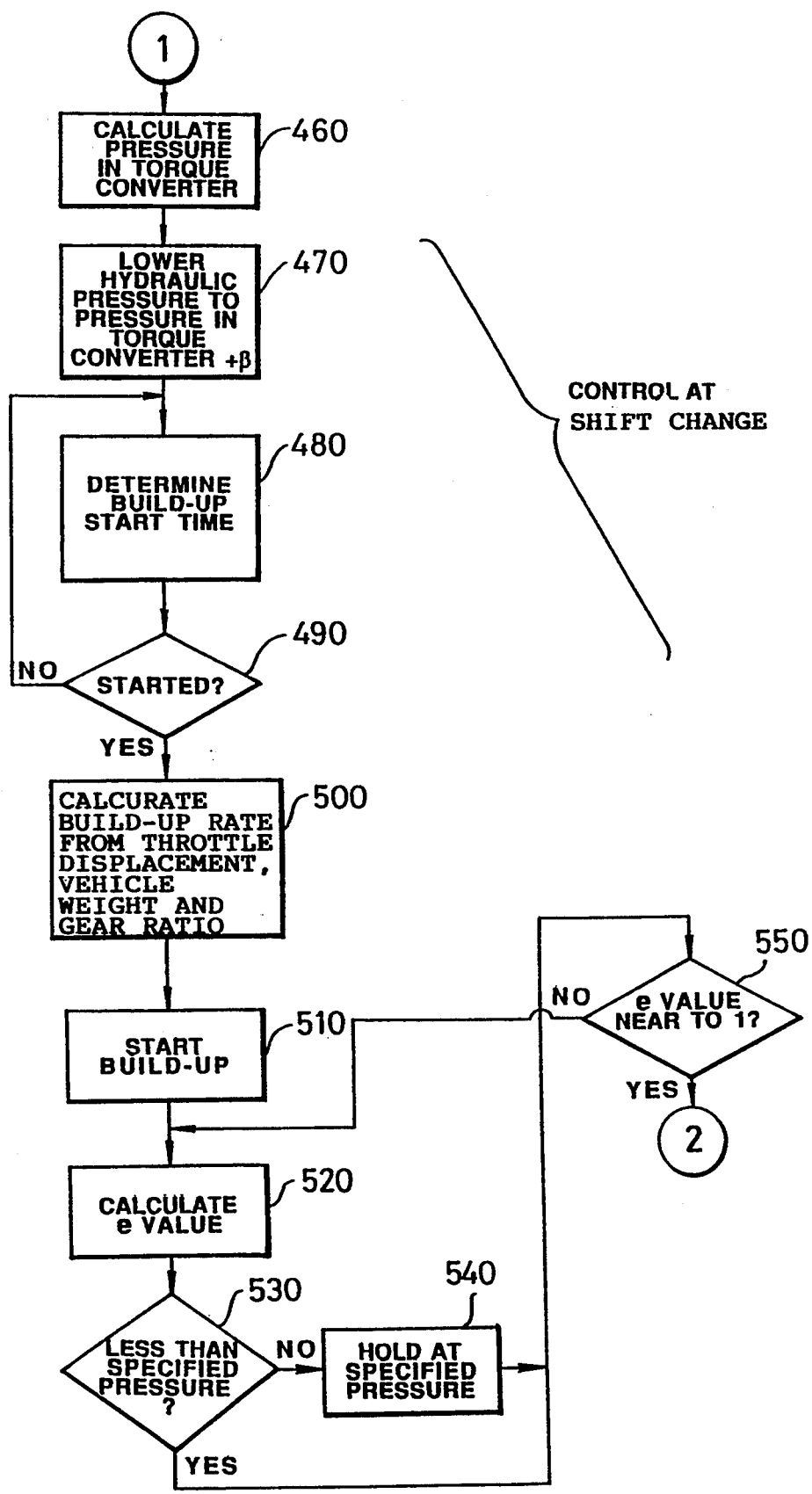

At the time of speed changing, the controller 10 calculates the pressure $P_t$ in the torque converter based on an output from the engine rotation sensor 6 (step 460 in FIG. 10(b)), reduces the hydraulic pressure in the lock-up clutch 4 to a level of $(P_t+F)$ which represents a predetermined pressure $\beta$ with the calculated value $P_t$ of pressure in the torque converter 2 added thereto and then holds this value of hydraulic pressure $(P_t+\beta)$ for a short period of time (step 470).

While the foregoing operative state is maintained, the controller 10 determines a build-up starting time point $t_s$ when gradual increasing of hydraulic pressure starts (step 480). To determine a timing of the build-up is started, the following three methods have been proposed.

(a) Method of setting an interval time

According to this method, an optimum interval time $T_1$ is previously derived by simulation, actual vehicle test or the like using each speed stage and engine power (represented by the extent of opening of the throttle) as parameters (see FIG. 14) and then it is stored in the memory of the controller 10 in the form of a map, as shown in FIG. 15. During the speed changing of the vehicle, the interval time $T_1$ corresponding to the output from the throttle quantity sensor 13 and the current speed stage is read from the memory, and build-up of the hydraulic pressure is started when the interval time $T_1$ elapses.

(b) Method of sensing the number of relative revolutions of the clutch

Figure 16:
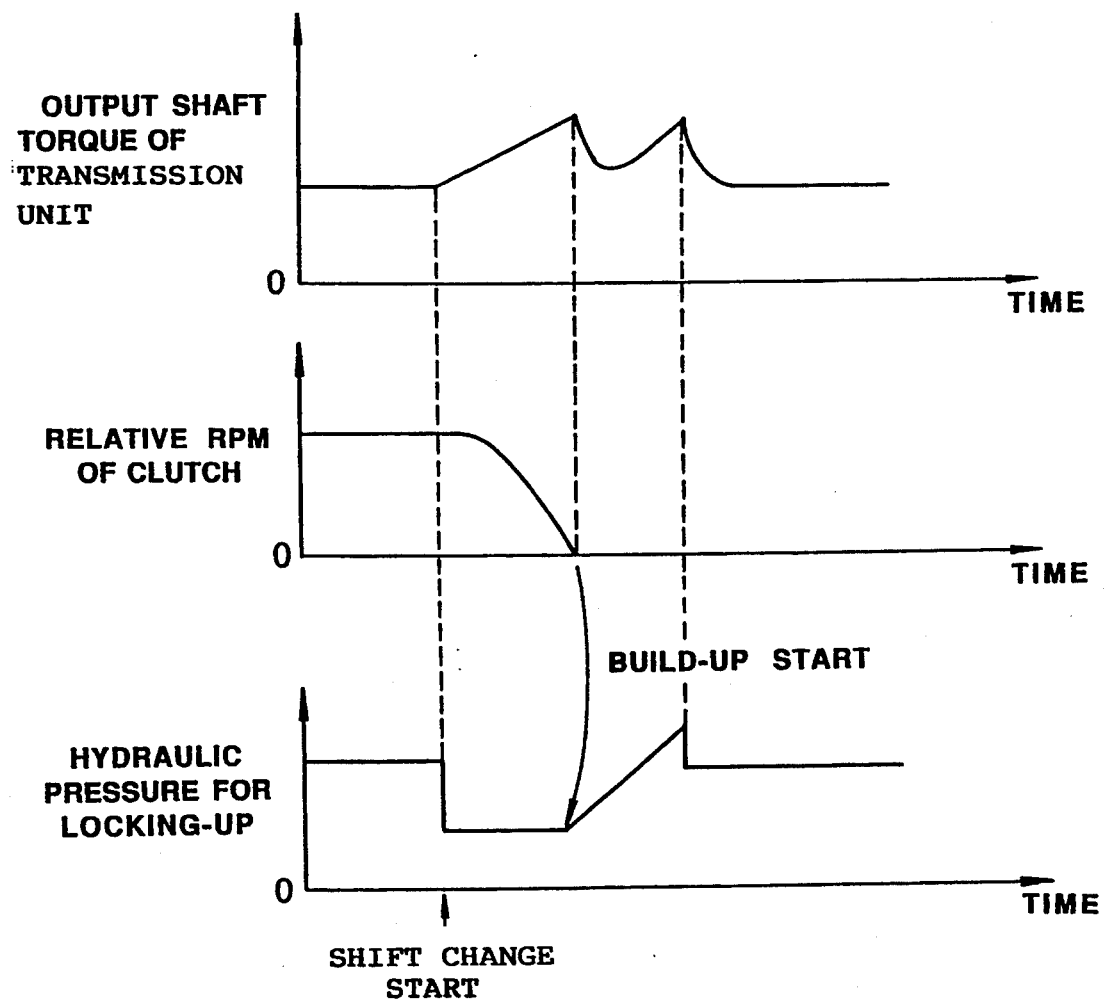
FIGS. 16 and 17 show a plurality of time charts, respectively, which schematically illustrate other method of determining a timing of starting build-up.

According to this method, the number of relative revolutions of the clutch (which is equal to $n_3 \cdot G - n_2$, where G designates a gear ratio) is derived based on the output $n_2$ from the input shaft rotation sensor 7 and the output $n_3$ from the output shaft sensor 8 of the transmission, and when the calculated value is reduced to zero or almost zero as shown in FIG. 16, this is identified as a build-up starting time.

(c) Method of sensing the e value of the torque converter

Figure 17:
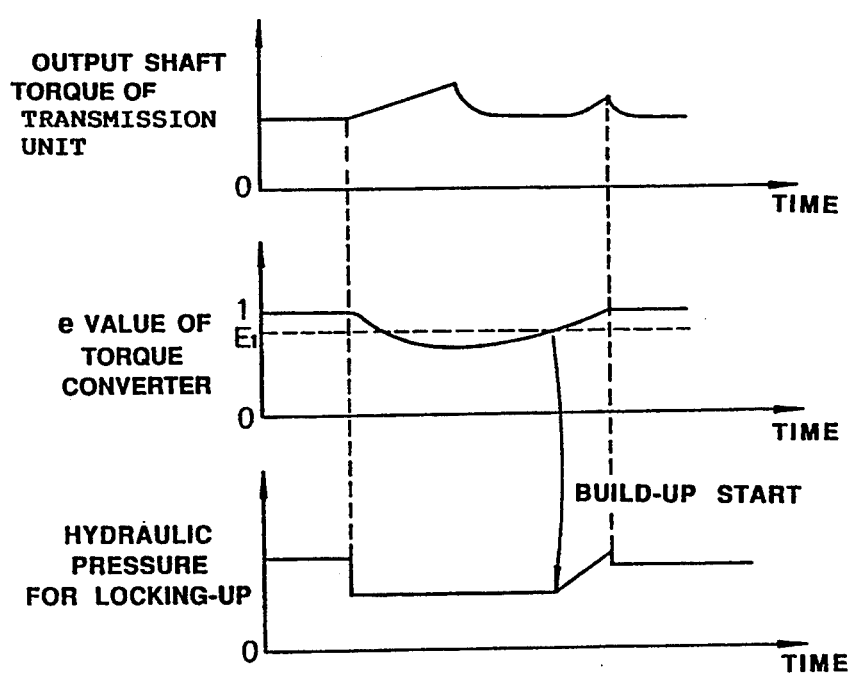

According to this method, the e value of the torque converter (which is equal to $n_2/n_1$) is calculated based on the output from the engine rotation sensor 6 and the input shaft sensor 7 (or the output shaft sensor 8 of the transmission), and when this e value is in excess of a certain set value $E_1$ as shown in FIG. 17, this term is identified as a build-up starting time.

Among the above-described three methods, the method (a) is most simple and practical. To carry out the methods (b) and (c), a rotation sensor is required for each of them but the method (b) is a method advantageously employable for improving a characteristic of acceleration and the method (c) is a method advantageously employable for reducing of shock caused by speed changing.

When the controller 10 determines using any one of the aforementioned methods that the build-up starting time $t_s$ is reached (step 490), it measures the extent of opening of the throttle S, the vehicle weight I and the gear ratio, calculates an optimum build-up rate dp/dt based on the measured values in accordance with the above Equation (20) (step 500) and then gradually increases hydraulic pressure in response to the calculated value dp/dt in the same manner as the aforementioned controlling operation at the time of starting of forward movement of the vehicle (step 510). The operation of gradually increasing the hydraulic pressure is interrupted when the e value of the torque converter reaches "1" or the set value "$E_o$" which is very near to 1 and, when the clutch pressure exceeds the upper limit set pressure $P\alpha$ before the e value reaches "1" or the set pressure value $E_o$, the clutch pressure is maintained at a level of the upper limit set value $P\alpha$ in the same manner at the time of starting of forward movement of the vehicle (steps 520 to 550). Thereafter, as the vehicle runs, the controller 10 carries out control as described above in the item (4) so as to allow the lock-up pressure to assume a value corresponding to the engine output torque T.

Figure 18:
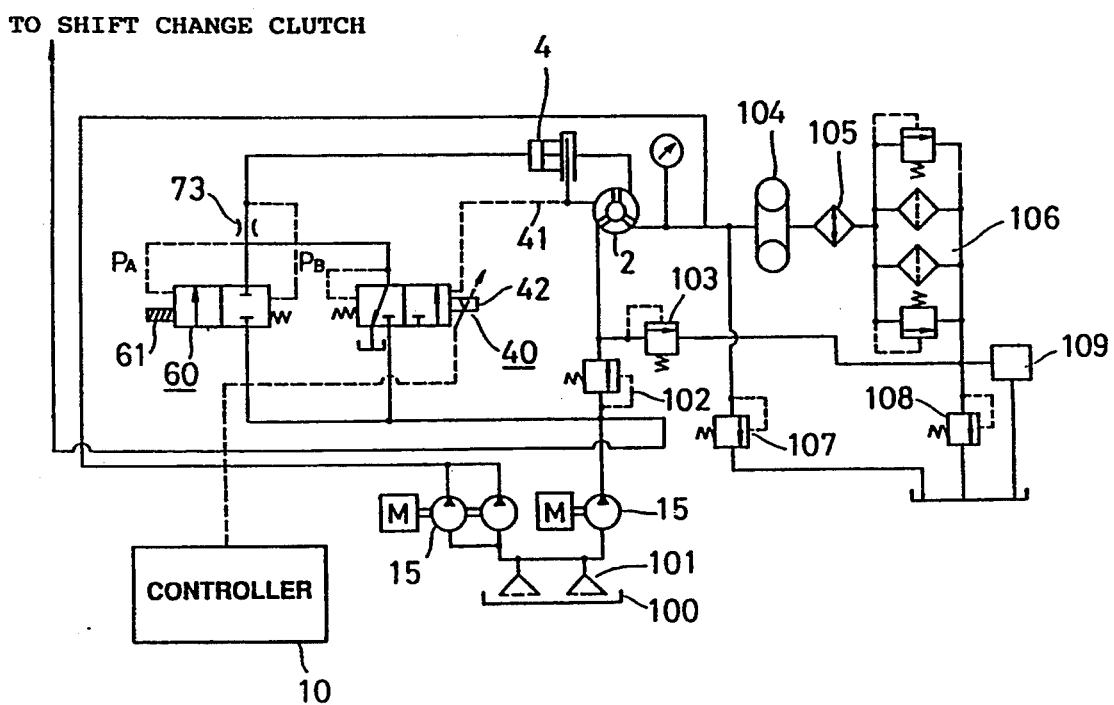
FIG. 18 is a hydraulic circuit diagram which illustrates an apparatus for controlling a lock-up clutch in accordance with further another embodiment of the present invention.

(6) Feedback of hydraulic pressure in the torque converter + flow rate control valve + filling detecting sensor The item (6), i.e., the structure as shown in FIG. 18 is such that a flow rate detecting valve 60 is disposed in addition to the system structure as shown in FIG. 3. The flow rate detecting valve 60 is provided with a filling detecting sensor 61. Incidentally, same or similar other structural components as those in FIG. 3 are represented by same reference numerals. Thus, repeated description will not be required.

The electronic type control valve 40 is a proportional control valve adapted to be actuated in response to an electrical command outputted from the controller 10 in the same manner as mentioned above. To prevent the lock-up actual initial hydraulic pressure $P_s$ from varying due to variation of the hydraulic pressure in the torque converter, the hydraulic pressure in the torque converter is fed back to the proportional solenoid 42 side of the pressure control valve 20 via a hydraulic passage 41.

The flow rate detecting valve 60 is disposed so as to allow hydraulic oil to be fed to the lock-up clutch 4 at a high flow rate during the filling operation to shorten a period of time required for the filling operation. The flow rate detecting valve 60 is provided with a filling detecting sensor 61 for detecting completion of the filling operation based on movement of the spool in the flow rate detecting valve 60.

Figure 19:
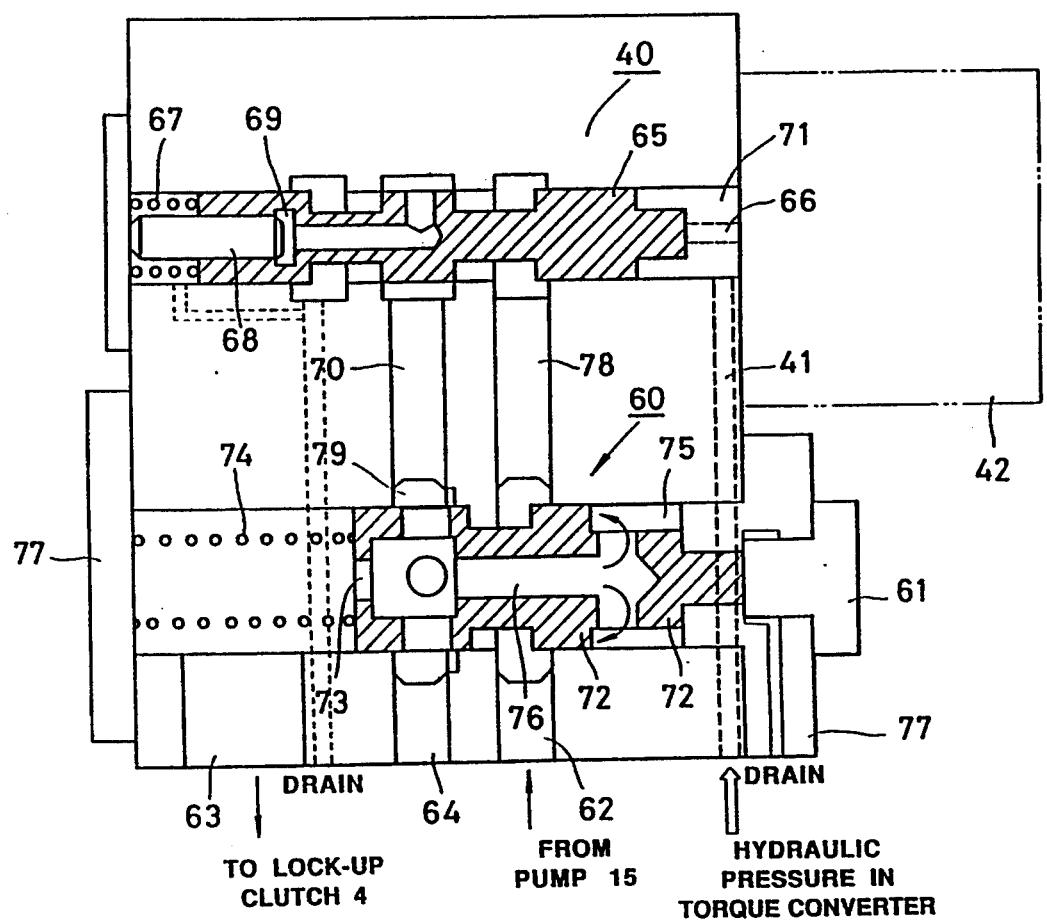
FIG. 19 is a sectional view which illustrates by way of example the inner structure of an electronic type pressure control valve for the apparatus in FIG. 18.

FIG. 19 is a schematic sectional view which illustrates by way of example the inner structure of the pressure control valve 40, the flow rate detecting valve 60 and the filling detecting sensor 61.

With the structure as shown in FIG. 19, hydraulic oil delivered from the hydraulic pump 15 is introduced into the flow rate detecting valve 60 via an input port 62 so that it is supplied to the lock-up clutch 4 via an output port 63. At this moment, a port 64 is kept closed.

The electronic type pressure control valve 40 includes a spool 65 of which right-hand end comes in contact with a plunger 66 of the proportional solenoid 42 and of which left-hand end is resiliently supported by a spring 67. Hydraulic pressure in a hydraulic chamber 70 is introduced into a hydraulic chamber 69 which is defined by the spool 69 and the piston 68. Further, the pressure control valve 40 includes a hydraulic chamber 71 on the proportional solenoid 42 side into which the hydraulic pressure in the torque converter is introduced via a hydraulic passage 41.

The flow rate detecting valve 60 includes a spool 72 which is formed with an orifice 73 on the output port 63 side. The left-hand end surface of the spool 72 is resiliently supported by a spring 74 and hydraulic pressure before the orifice 73 is delivered to a hydraulic chamber 75 via a hydraulic passage 76.

An electromagnetic pick-up 61 serving as a filling detecting sensor is attached to the right-hand end surface of the flow rate detecting valve 60 with a housing cover 77 interposed therebetween. The controller 10 determines completion of the filling when the pick-up 61 detects movement of the spool 72 of the flow rate control valve 60. Namely, voltage induced by the pick-up 61 varies as the spool 72 is displaced toward or away from the pick-up 61, whereby movement of the spool 72 can be detected by detecting variation of the induced voltage.

When it is required that the lock-up clutch 4 is brought in an operatively engaged state with the combined structure of the pressure control valve 40 and the flow rate detecting valve 60 as shown in FIGS. 18 and 19, the controller 10 turns on the solenoid 42 of the pressure control valve 40. This permits the spool 61 of the pressure control valve 40 to be displaced in the leftward direction, whereby hydraulic oil delivered from the hydraulic pump 15 flows in the pressure control valve 40 via the input port 62 and the hydraulic passage 78. Then, the hydraulic oil which has flowed in the pressure control valve 40 flows further in the flow rate detecting valve 60 via a hydraulic passage 70 and a port 79 so that it is delivered to the lock-up clutch 4 via the orifice 74 in the spool 72 and the output port 63. The hydraulic oil in the port 79 is introduced into the hydraulic chamber 75 via the hydraulic passage 76 in the spool 72.

This causes a differential pressure to be generated across the orifice 73, whereby the spool 72 is displaced in the leftward direction under the effect of the differential pressure until the flow rate detecting valve 60 is opened. Consequently, pressurized hydraulic oil which has flowed in the input port 62 enters directly the port 79 and then it is delivered to the lock-up clutch 4 via the orifice 73. Supplying of hydraulic oil to the lock-up clutch 4 via the flow rate detecting valve 60 continues until the clutch pack is fully filled with hydraulic oil.

As shown in FIG. 5, hydraulic pressure in the lock-up clutch 4 is kept at a level of almost zero for a period of filling time $t_f$ until the clutch pack is filled with hydraulic oil. On completion of the filling, it is raised up to the initial pressure $P_c$.

When the clutch pack is fully filled with hydraulic oil, the filling operation is ended and no hydraulic oil flows any more with the result that the differential pressure across the orifice 73 disappears. This allows the spool 72 of the flow rate detecting valve 60 to be displaced by restorable force of the spring 74 until the flow rate detecting valve 60 is restored to the closed state.

Namely, when the clutch pack is fully filled with hydraulic oil, the spool 72 of the flow rate detecting valve 60 is restored to the position as shown in FIG. 19 under the effect of restorable force of the coil 74. Thus, completion of the filling can exactly be detected by detecting completion of the return movement of the spool 72 by the pick-up 61.

The detection signal of the pick-up 61 is inputted into the controller 10. After the controller 10 detects completion of the filling in response to the input signal, hydraulic pressure in the lock-up clutch 4 is gradually increased by gradually increasing a magnitude of electricity to be fed to the solenoid 42.

Namely, with the combined structure of the pressure control valve 40 and the flow rate detecting valve 60 as shown in FIGS. 18 and 19, the pressure $P_t$ in the torque converter 2 is fed back to the hydraulic chamber 71 on the solenoid 42 side of the pressure control valve 40 to cancel the pressure $P_t$ in the torque converter 2 which is exerted on the back pressure portion of the piston of the lock-up clutch 4, whereby variation of the lock-up actual initial hydraulic pressure $P_s$ due to variation of the hydraulic pressure in the torque converter 2 can be suppressed. Accordingly the lock-up actual initial pressure $P_s$ can always assume a constant value by holding the solenoid driving current i constant at the time of completion of the filling. With this combined structure, arrangement of the flow rate detecting valve 60 makes it possible to supply the lock-up clutch 4 with hydraulic oil at a high flow rate. Since the time of completion of the filling can exactly be determined by sensing movement of the spool 72 of the flow rate detecting valve 60 using the pick-up 61, hydraulic pressure in the lock-up clutch 4 at the time of completion of the filling, i.e., the initial pressure in the clutch can be reduced almost to a level of hydraulic pressure in the torque converter 2, whereby shock caused when the lock-up clutch 4 is brought in an operatively engaged state with the initial pressure can be reduced remarkably.

Incidentally, with the combined structure as shown in FIG. 19, completion of the filling is determined by detecting movement of the spool 72 of the flow rate detecting valve 60 using the pick-up 61. Alternatively, filling detecting means having any other structure may be employed, provided that it is proven that completion of the filling is detected based on movement of the spool 72 of the flow rate detecting valve 60. For example, completion of the filling may be detected in such a manner that a piston disposed leftward of the spool 72 is resiliently supported by the spring 74 and displacement of the piston toward and away from the housing cover 77 is electrically detected as the spool 72 moves.

Figure 20:
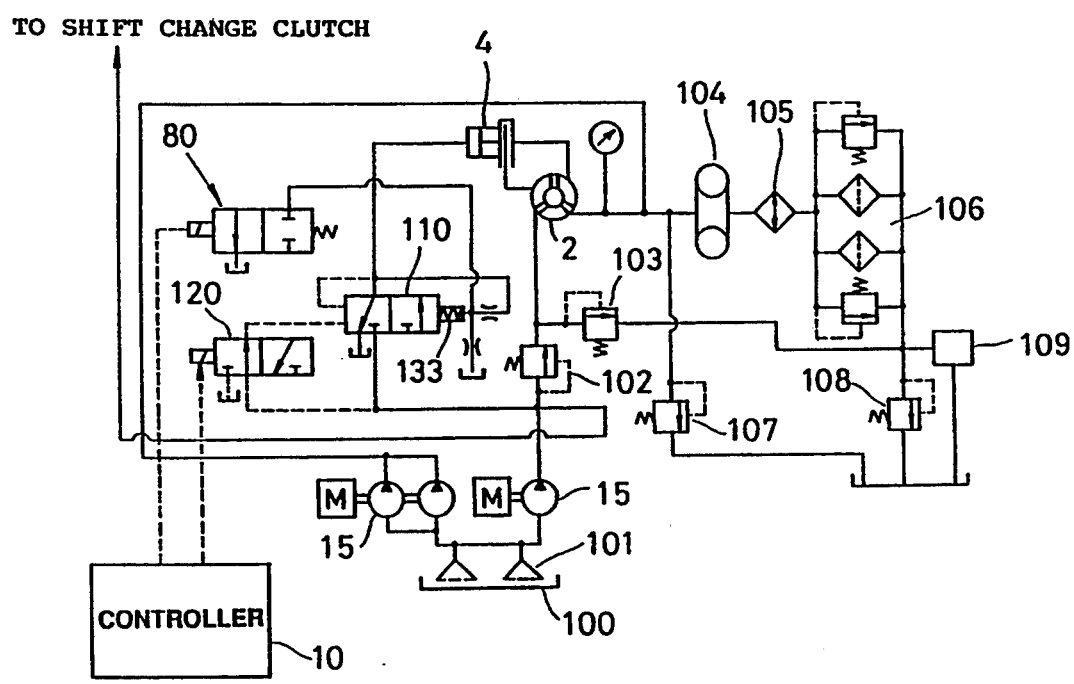
FIG. 20 is a hydraulic circuit diagram which schematically illustrates an apparatus for controlling a lock-up clutch in accordance with further another embodiment of the present invention.

(7) Mechanical modulation structure + half lock-up control to be carried out by a solenoid valve for drainage The item (7) is concerned with a structure for a conventional hydraulic control system as shown in FIG. 25 having a solenoid valve 80 for the purpose of drainage added thereto, as shown in FIG. 20. Same or similar structural components as those in FIG. 25 are identified by same reference numerals. Thus, their repeated description will not be required.

The solenoid valve 80 serves to bring hydraulic oil in the load piston control chamber of a modulation valve 110 to a drain port. With such a control system, hydraulic pressure in the lock-up clutch 4 is controlled by operation of the modulation valve 110, the solenoid valve 110 and the solenoid valve 80 (hereinafter referred to as a drain valve).

Figure 21:
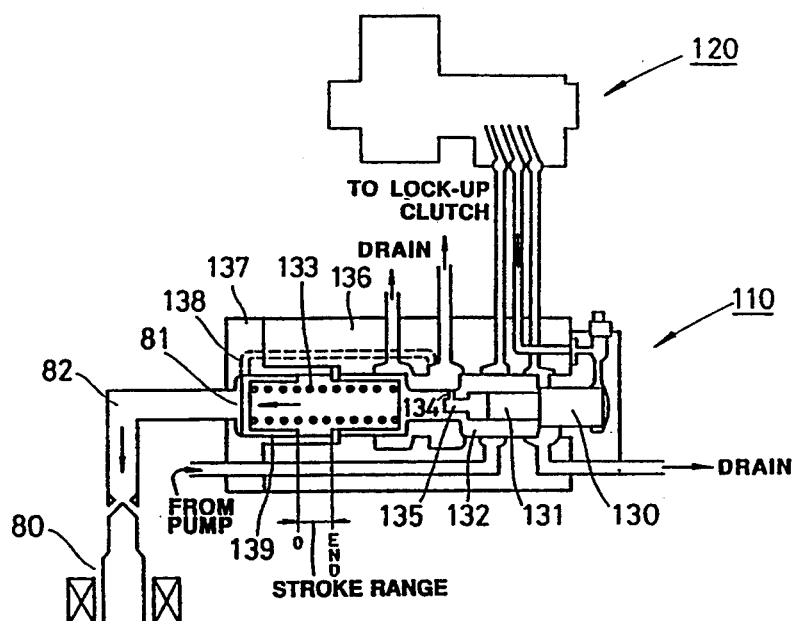
FIGS. 21 and 22 are a schematic sectional view of a pressure control valve, respectively, which illustrates by way of example the inner structure of the pressure control valve for the apparatus.
Figure 22:
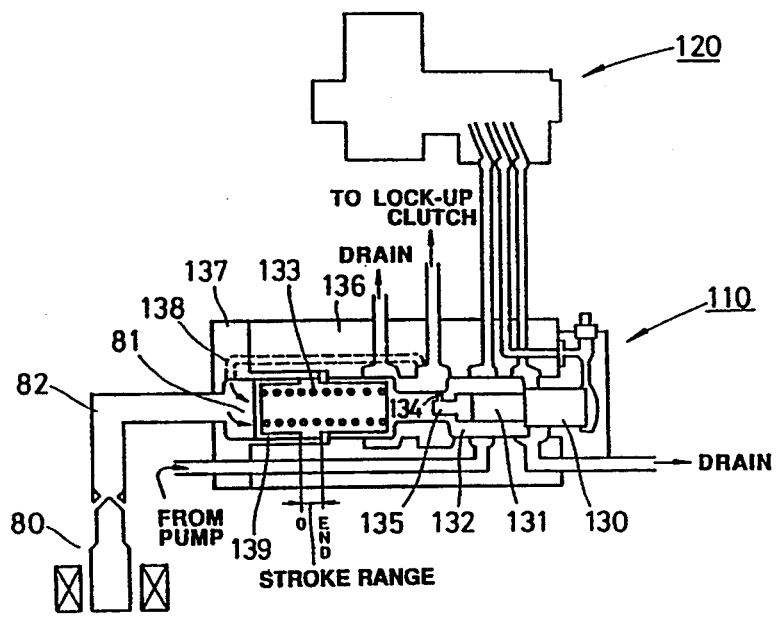

FIGS. 21 and 22 illustrate by way of example the inner structure of these three valves, respectively. As shown in FIGS. 21 and 22, a load piston control chamber 81 for allowing hydraulic pressure to be exerted on a piston 139 of the modulation valve 110 is communicated with a drain port via a hydraulic passage 82 and the drain valve 80 so that the drain valve 80 determines whether hydraulic oil should be drained or not.

Figure 23:
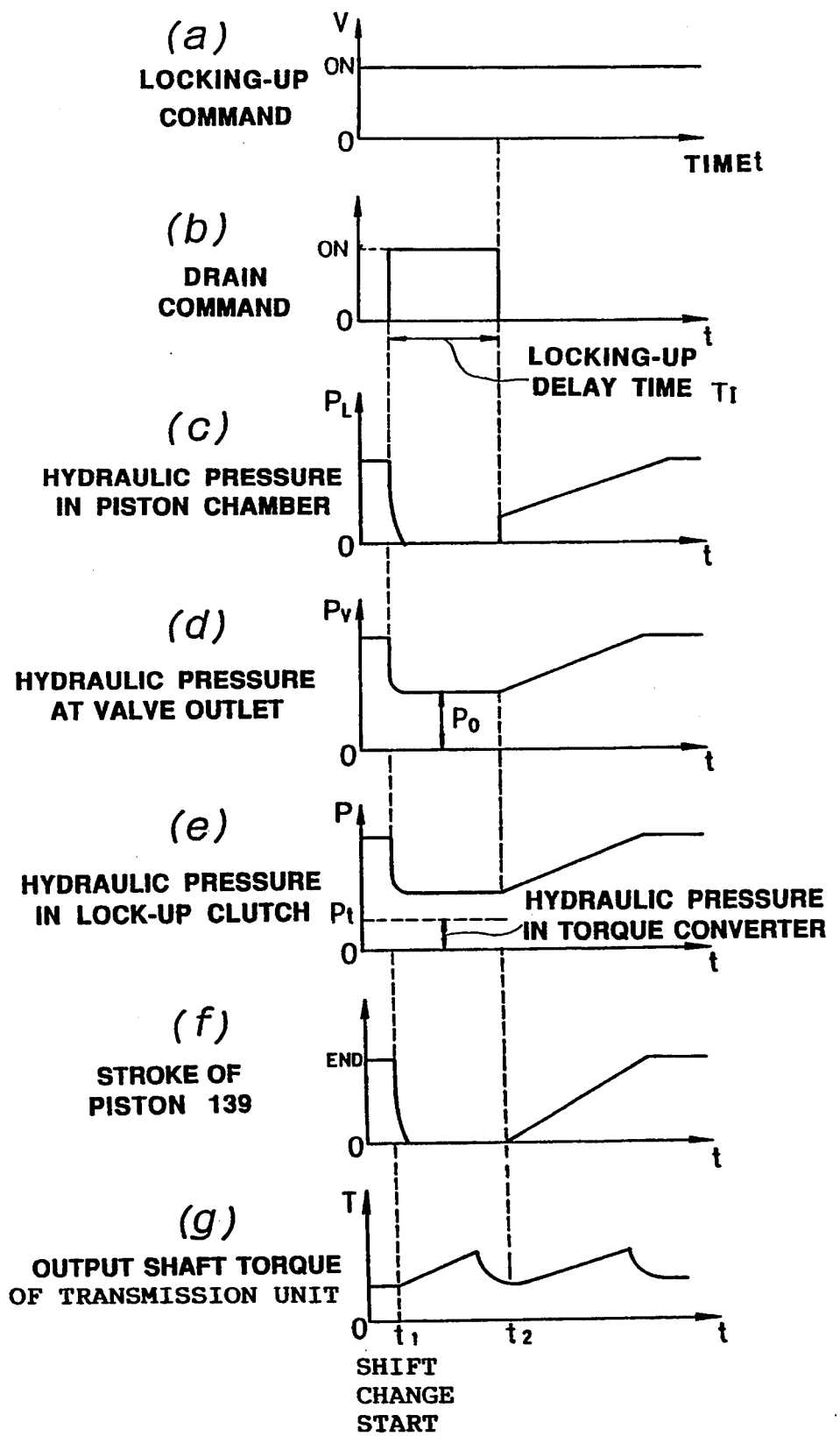
FIG. 23 shows a plurality of time charts which illustrate by way of example operations of the apparatus during speed changing.

Operations of the solenoid valve 120, the modulation valve 110 and the drain valve 80 as constructed in the above-described manner during speed changing will be described below with reference to FIG. 23 which shows a plurality of time charts as well as FIG. 1.

FIG. 23(a) shows a command voltage to be given to the solenoid valve 120 by the controller 10, FIG. 23(b) shows a command voltage to be given to the drain valve 80, FIG. 23(c) shows hydraulic pressure $P_L$ in the piston chamber 81, FIG. 23(d) shows hydraulic pressure $P_y$ at an outlet port of the modulation valve 110, FIG. 23(e) shows hydraulic pressure in the lock-up clutch 4, FIG. 23(f) shows a stroke of the piston 139 and FIG. 23(g) shows torque on the output shaft of the transmission.

While the number $n_1$ of revolutions of the engine exceeds the minimum number of revolutions of the lock-up clutch 4, the controller 10 feeds the solenoid valve 120 with a command voltage so as to allow the solenoid valve 120 to be shifted to an "ON" state before speed changing, as shown in FIG. 23(a). When speed changing is commanded while the foregoing state is maintained (time $t_1$), the controller 10 feeds the drain valve 80 with a command voltage represented by "ON" (see FIG. 23(b)), whole the command voltage to the solenoid valve 120 is left unchanged at the "ON" state (see FIG. 23(a)). The controller 10 holds the drain valve 80 at the "ON" state for the period of lock-up delay time $T_1$, and after the delay time $T_1$ elapses, the controller 10 reduces the command voltage to the drain valve 80 to a level of zero (time $t_2$). As a result, the drain valve 80 is shifted to the drain side so that hydraulic oil in the load piston control chamber 81 is quickly drained via the hydraulic passage 82. Thus, the load piston 139 is returned from the position shown in FIG. 22 to the position shown in FIG. 21, i.e., the position where a spring 133 is initially accommodated in the load piston 139 (FIG. 23(f), time $t_1$) with the result that hydraulic pressure $P_y$ at an outlet port of the modulation valve 110 is reduced to the initial pressure $P_o$ (which is equal to $Kx/S_1$, where K designates a spring constant, x designates an initial displacement and $S_1$ designates a pressure receiving surface area of the piston 131) as shown in FIG. 23(d), and the hydraulic pressure $P_y$ is held at the initial pressure $P_o$ for the period of lock-up delay time. Accordingly, hydraulic pressure in the lock-up clutch varies in the substantially same manner as the hydraulic pressure $P_y$ at the outlet port of the modulation valve 110, as shown in FIG. 23(e).

When the lock-up delay time elapses, the controller 10 reduces the command voltage to the drain valve 80 to zero to close the drain valve 80 (time $t_2$). Consequently, the hydraulic oil which has entered the load piston control chamber 81 via an orifice 138 is intercepted in the load piston control chamber 81, whereby the load piston 139 is displaced in the rightward direction. As the load piston moves in the rightward direction as shown in FIG. 22, the hydraulic pressure in the lock-up clutch 4 is increased gradually. Thereafter, when the load piston 139 collides with a stopper, gradual increasing of the hydraulic pressure is stopped to assume a certain value. Thereafter, this value of hydraulic pressure is maintained.

Namely, according to the control system, the hydraulic pressure in the lock-up clutch is not completely released during the speed changing but the controller 10 carries out half lock-up control as shown FIG. 11 and FIG. 14 wherein hydraulic pressure in the hydraulic clutch is reduced to the initial pressure $P_o$ higher than the pressure $P_t$ in the torque converter. As a result, hydraulic pressure in the lock-up clutch can be built up from the value of initial hydraulic pressure corresponding to the hydraulic pressure at the time of completion of the filling in a good timing relationship. Thus, a characteristic of acceleration can be improved and shock appearing when the lock-up clutch is brought in an operatively engaged state can be reduced substantially, as shown in FIG. 23(g).

The reason why the lock-up clutch is released during the speed changing consists in reduction of load to be carried by the speed changing clutch. According to this control system, however, thermal load to be carried by the clutch can be distributed to the speed changing clutch and the lock-up clutch by reducing torque to be transmitted via the lock-up clutch (i.e., by bringing the lock-up clutch 4 in a slippery state), resulting in durability of these clutches being improved.

Figure 24:
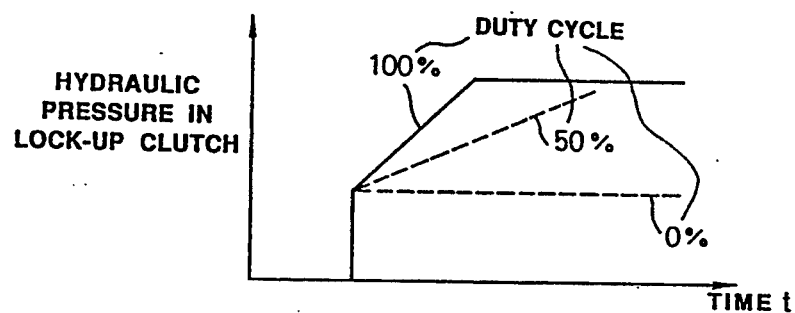
FIG. 24 is a time chart which illustrates variable control for a rate of gradual increasing of hydraulic pressure in accordance with a duty control process.

Incidentally, the timing for starting the gradual increase of hydraulic pressure in the lock-up clutch (time $t_2$) can be determined in accordance with one of the following three methods.
(a) Method of setting interval time
(b) Method of sensing the number of relative revolutions of a clutch
(c) Method of sensing an e value of the torque converter A build-up rate during gradual increasing of hydraulic pressure may be varied in dependence on the extent of opening of the throttle, the vehicle weight (weight of the vehicle body + quantity of load placed on the vehicle body) and the gear ratio of the transmission, as mentioned above. Variable control for determining such a build-up rate can easily be realized by carrying out duty control as shown in FIG. 24 in response to a voltage command to be given to the drain valve 80. Here, duty ratios of 0%, 50% and 100% are shown in FIG. 24.

INDUSTRIAL APPLICABILITY

The present invention is advantageously employable for a speed changing unit including a lock-up clutch by way of which the input shaft of a torque converter is operatively connected to the output shaft of the torque converter which is installed on a construction machine such as a truck, a wheel loader or the like vehicle.

We claim:

1. A combination of a lock-up clutch and an apparatus for controlling a lock-up clutch comprising;
a lock-up clutch disposed between an engine and a transmission so as to allow the input shaft of a torque converter and the output shaft of said torque converter to be operatively connected to each other via said lock-up clutch, whereby hydraulic pressure in said torque converter is exerted on a back pressure portion of a piston thereof,
a pressure control valve which is constructed such that hydraulic pressure at an output port leading to said lock-up clutch is exerted on one pressure receiving surface of a spool and the plunger of a proportional solenoid comes in contact with a second pressure receiving surface of said spool, and hydraulic pressure in said torque converter is exerted on a pressure receiving surface on the proportional solenoid side of the pressure control valve, and
controlling means for allowing an electrical command to be input into said proportional solenoid of said pressure control valve so as to carry out control for opening/closing of the pressure control valve and gradual increasing of hydraulic pressure in response to the electrical command.

2. A combination of a lock-up clutch and an apparatus for controlling a lock-up clutch comprising;
a lock-up clutch disposed between an engine and a transmission so as to allow an input shaft of a torque converter and an output shaft of said torque converter to be operatively connected to each other via said lock-up clutch,
a first valve including a spool which is formed with an orifice at an output port leading to said lock-up clutch, said first valve being opened and closed by differential pressure across said orifice and resilient force of a spring and having an inlet port through which hydraulic oil delivered from a hydraulic pump is supplied,
a second valve including a spool of which one pressure receiving surface receives hydraulic pressure before the orifice of the first valve and of which other pressure receiving surface is thrusted by an actuator adapted to generate thrust force in response to an electrical command, said second valve having an inlet port through which hydraulic oil delivered from said hydraulic pump is supplied and an outlet port leading to a region located before the orifice of the first valve,
filling completion detecting means for detecting completion of filling of said lock-up clutch with hydraulic oil based on movement of the spool of the first valve, and
controlling means for allowing an electrical command to be inputted into said second valve to carry out control for opening/closing of the second valve and gradual increasing of hydraulic pressure, wherein said lock-up clutch is such that hydraulic pressure in said torque converter is exerted on a back pressure portion of a piston thereof and said hydraulic pressure in said torque converter is exerted on a pressure receiving surface on an actuator side of the second valve.

3. The combination as claimed in claim 2, wherein said actuator comprises a proportional solenoid.

4. The combination as claimed in claim 2, wherein said filling completion detecting means comprises an electromagnetic pick-up.

5. The combination as claimed in claim 2, wherein said filling completion detecting means includes a piston member secured to the spool of the first valve and engagement/disengagement detecting means for electrically detecting engagement of said piston member with a housing cover and disengagement of said piston member from said housing cover.

6. The combination of an apparatus for controlling a lock-up clutch and a control apparatus comprising;
a pressure control valve connected to said lock-up clutch to generate hydraulic pressure in the lock-up clutch in response to an input electrical command, first detecting means for detecting the amount of throttle, second detecting means for detecting weight of a vehicle, third detecting means for sensing a gear ratio of the transmission, said gear ratio being determined depending on the speed stage, and controlling means for calculating the rate of increasing of hydraulic pressure during the gradual increasing of hydraulic pressure based on detection outputs from said first, second and third detecting means and for determining producing and outputting an electrical command corresponding to the calculated rate of increase of hydraulic pressure for input into said pressure control valve.

7. An apparatus for controlling a lock-up clutch as claimed in claim 6, wherein said controlling means includes a memory in which a value of acceleration of increase of hydraulic pressure corresponding to the quantity of throttle, weight of the vehicle and the gear ratio is previously stored and an electrical command to be input into the pressure control valve is created based on data read from said memory.

8. The combination of an apparatus for controlling a lock-up clutch and a control apparatus comprising;

a first valve for supplying hydraulic oil to said lock-up clutch from a hydraulic pump, said first valve including a spool of which one pressure receiving surface receives hydraulic pressure at an output port leading to the lock-up clutch and of which other pressure receiving surface comes in contact with a piston, hydraulic pressure in a predetermined chamber into which hydraulic oil is introduced from said output port being exerted to said piston, a second valve for controlling opening/closing of said first valve in response to an electrical command inputted thereinto in an ON/OFF position, a third valve adapted to be shifted in response to an electrical command input thereinto in an ON/OFF fashion based in a determination as to whether hydraulic oil in said hydraulic chamber of the first valve should be drained or not, and controlling means for controlling a shifting operation of each of said second and third valves and determining, producing and outputting an electrical command or response to the calculated rate of increase of hydraulic pressure in each of said shifting positions such that the second valve is maintained in an ON state for a predetermined period of time n response to the electrical command input into the second valve during speed changing and the third valve is maintained in an ON state for a predetermined period of time in response to the electrical command input into the third valve during speed changing.

9. An apparatus for controlling a lock-up clutch as claimed in claim 8, wherein an initial hydraulic pressure in the lock-up clutch is set under a condition that thrust force created by said spring in the first valve is balanced with force generated by hydraulic pressure exerted on one pressure receiving surface of the spool.

10. An apparatus for controlling a lock-up clutch as claimed in claim 9, wherein hydraulic pressure in the torque converter is exerted on a back pressure portion of a piston of the lock-up clutch and said initial hydraulic pressure has a value appreciably larger than that of the hydraulic pressure in the torque converter.

* * * * *